US009115242B2

(12) United States Patent
Jaunky et al.

(10) Patent No.: US 9,115,242 B2
(45) Date of Patent: Aug. 25, 2015

(54) COPOLYMERS WHICH CAN BE OBTAINED FROM URETHANE-BASED, POLYSILOXANE-CONTAINING MACROMONOMERS, PROCESSES FOR THE PREPARATION THEREOF AND THEIR USE

(75) Inventors: Wojciech Jaunky, Wesel (DE); Marc Hans, Wesel (DE); Albert Frank, Xanten (DE); Bernd Göbelt, Wesel (DE); René Nagelsdiek, Hamminkeln (DE); Alfred Bubat, Wesel (DE); Heike Bubat, legal representative, Wesel (DE); Jürgen Omeis, Dorsten-Lembeck (DE)

(73) Assignee: BYK-Chemie GmbH (DE)

( * ) Notice: Subject to any disclaimer, the term of this patent is extended or adjusted under 35 U.S.C. 154(b) by 137 days.

(21) Appl. No.: 13/988,087

(22) PCT Filed: Nov. 17, 2011

(86) PCT No.: PCT/EP2011/070367
§ 371 (c)(1),
(2), (4) Date: Aug. 5, 2013

(87) PCT Pub. No.: WO2012/066084
PCT Pub. Date: Mar. 24, 2012

(65) Prior Publication Data
US 2013/0310464 A1 Nov. 21, 2013

(30) Foreign Application Priority Data

Nov. 17, 2010 (EP) ..................................... 10191564

(51) Int. Cl.
| | | |
|---|---|---|
| *C08F 30/08* | (2006.01) | |
| *C08G 18/28* | (2006.01) | |
| *C08G 18/67* | (2006.01) | |
| *C09D 175/16* | (2006.01) | |
| *C08G 77/46* | (2006.01) | |
| *C08G 77/458* | (2006.01) | |
| *C08G 77/20* | (2006.01) | |

(52) U.S. Cl.
CPC .............. *C08F 30/08* (2013.01); *C08G 18/289* (2013.01); *C08G 18/672* (2013.01); *C09D 175/16* (2013.01); *C08G 77/20* (2013.01); *C08G 77/458* (2013.01); *C08G 77/46* (2013.01)

(58) Field of Classification Search
None
See application file for complete search history.

(56) References Cited

U.S. PATENT DOCUMENTS

| | | | |
|---|---|---|---|
| 5,855,825 A * | 1/1999 | Ito ................................... | 264/2.6 |
| 6,291,620 B1 | 9/2001 | Moad et al. | |
| 6,362,274 B1 | 3/2002 | Legrand et al. | |
| 6,524,564 B1 * | 2/2003 | Kim et al. .................. | 424/70.12 |
| 6,545,114 B1 * | 4/2003 | Yang et al. ...................... | 528/26 |
| 7,034,085 B2 | 4/2006 | Mestach et al. | |
| 8,124,668 B2 * | 2/2012 | Baba et al. ..................... | 523/106 |
| 2002/0198280 A1 * | 12/2002 | Baba et al. ..................... | 522/99 |
| 2006/0247353 A1 * | 11/2006 | Ueda et al. ..................... | 524/430 |
| 2008/0125546 A1 * | 5/2008 | Yamaguchi et al. .......... | 525/123 |
| 2013/0056889 A1 * | 3/2013 | Jan .................................. | 264/1.1 |

FOREIGN PATENT DOCUMENTS

| | | |
|---|---|---|
| DE | 19501307 A1 | 7/1996 |
| DE | 19520312 A1 | 12/1996 |
| DE | 19618569 A1 | 11/1997 |
| DE | 19919482 A1 | 11/2000 |
| DE | 10361436 A1 | 7/2005 |
| DE | 102006006716 A1 | 8/2007 |
| EP | 0157396 A2 | 10/1985 |
| EP | 0270126 A2 | 6/1988 |
| EP | 0289240 A1 | 11/1988 |
| EP | 0401990 A2 | 12/1990 |
| EP | 0931537 A2 | 7/1999 |
| EP | 1251152 A1 | 10/2002 |
| EP | 1469029 A1 | 10/2004 |
| EP | 1532213 A2 | 5/2005 |
| EP | 1758550 A2 | 3/2007 |
| EP | 1980594 A1 | 10/2008 |
| JP | 62205116 A | 9/1987 |
| JP | 335014 A | 2/1991 |
| JP | 06116390 A | 4/1994 |
| JP | 2008525615 A | 7/2008 |
| WO | WO-98/01478 A1 | 1/1998 |
| WO | WO-98/46693 A1 | 10/1998 |
| WO | WO-98/58974 A1 | 12/1998 |
| WO | WO-99/31144 A1 | 6/1999 |
| WO | WO-01/88044 A1 | 11/2001 |
| WO | WO-2004/056716 A1 | 7/2004 |
| WO | WO-2005/063637 A1 | 7/2005 |

(Continued)

OTHER PUBLICATIONS

"International Application No. PCT/EP2011/070367, International Patentability Examination Report mailed Mar. 14, 2013", 6 pgs.
"International Application No. PCT/EP2011/070367, International Search Report and Written Opinion mailed Feb. 24, 2012", 13 pgs.
Moad, G., et al., "Living Radical Polymerization by the RAFT Process", Aust. J. Chem, 58(6), (2005), 379-410.
Braun, D., "Initiation of free radical polymerization by thermal cleavage of carbon—carbon bonds", *Macromolecular Symposia*, 111(1), (1996), 63-71.
Goto, A., et al., "Living Radical Polymerization with Nitrogen Catalyst: Reversible Chain Transfer Catalyzed Polymerization with N-Iodosuccinimide", *Macromolecules*, 41(17), (2008), 6261-6264.

(Continued)

*Primary Examiner* — Marc Zimmer
(74) *Attorney, Agent, or Firm* — Schwegman Lundberg & Woessner, P.A.

(57) ABSTRACT

The invention relates to a copolymer which can be obtained by free-radical copolymerization of one or more urethane-based, polysiloxane-containing macromonomers and one or more further free-radically polymerizable comonomers. Processes for preparing the copolymer and its use as additive in coating compositions and plastics and as wetting agent and dispersant in homogeneous dispersions are also described.

18 Claims, No Drawings

(56) References Cited

FOREIGN PATENT DOCUMENTS

| WO | WO-2005/066224 A1 | 7/2005 |
| WO | WO-2006/071388 A1 | 7/2006 |
| WO | WO-2007/076967 A2 | 7/2007 |

OTHER PUBLICATIONS

Gridnev, A. A, et al., "Catalytic Chain Transfer in Free-Radical Polymerizations", *Chem. Rev.*, 101(12), (2001), 3611-3659.

Gridnev, A., "The 25th Anniversary of Catalytic Chain Transfer", *J. of Poly. Sci., Part A: Polymer Chemistry*, 38(1), (2000), 1753-1766.

Harada, T., et al., "Preparation of Macromonomers by Copolymerization of Methyl Acrylate Dimer Involving β Fragmentation", *J. Polym. Sci., Part A*, 42(3), (2003), 597-607.

Hawker, C. J., et al., "New Polymer Synthesis by Nitroxide Mediated Living Radical Polymerizations", *Chem. Rev.*, 101(12), (2001), 3661-3688.

Houben-Weyl, *Methoden der Organischen Chemie (Methods of Organic Chemistry)*, vol. 14/2, (1963), 61-70.

Junkers, T., et al., "Thioketone-Mediated Polymerization of Butyl Acrylate: Controlling Free-Radical Polymerization via a Dormant Radical Species", *Macromol. Rapid Commun.*, 28(6), (2007), 746-753.

Kobatake, S., et al., "Radical Polymerization and Copolymerization of Methyl α-(2-Carbomethoxyethyl)acrylate, a Dimer of Methyl Acrylate, as a Polymerizable a-Substituted Acrylate", *J. Polym. Sci., Part A* 34(1), (1996), 95-108.

Lee, Wen-Fu, et al., "Synthesis and Characterization of Novel Sulfobetaines Derived from 2,4-Tolylene Diisocyanate", *Journal of Applied Polymer Science*, 82(14), (2001), 3447-3459.

Moad, G., et al., "Living free radical polymerization with reversible addition-fragmentation chain transfer (the life of RAFT)", *Polymer International*, 49(9), (Sep. 2000), 993-1001.

Otsu, T., et al., "Role of Initiator—Transfer Agent—Terminator (Iniferter) in Radical Polymerizations: Polymer Design by Organic Disulfides as Iniferters", *Die Makromolekulare Chemie, Rapid Communications*, 3(2), (1982), 127-132.

Perrier, S., et al., "Macromolecular design via reversible addition-fragmentation chain transfer (RAFT)/xanthates (MADIX) polymerization", *J. Polym. Sci. Part A: Polym. Chem.*, 43(22), (2005), 5347-5393.

Rekha, N., et al., "Solvent-Induced Self-Assembly in cardanol-Based Urethane Methacrylate Comb Polymers", *J. of Poly. Sci.: Part A: Polymer Chemistry*, 47(12), (2009), 2996-3009.

Sato, E., et al., "Macromonomer Synthesis Using α-(2-Methyl-2-phenylpropyl)acrylates as Addition-Fragmentation Chain-Transfer Agents Expelling the Cumyl Radical", *J. Polym. Sci., Part A*, 42(23), (2004), 6021-6030.

Siefken, W., "Mono- und Polyisocyanate IV. Mitteilung über Polyurethane", *Justus Liebig's Annalen der Chemie*, 562(2), (Apr. 1949), 75-136.

Suzuki. H., et al., "Synthesis of Polysiloxane-Grafted Fluoropolymers and Their Hydrophobic Properties.", (w/ English Abstract), *Journal of the Adhesion Society of Japan*, 36(6), (2000), 217-224.

Tanaka, H., et al., "Polymerization Reactivity of Unsaturated End Group Generated During the Disproportionation in Termination Reaction of Methyl Methacrylate Polymerization: A Study Using Model Compounds", *J. Polym. Sci. Part A*, 27(5), (1989), 1741-1748.

Toy A. A., et al., "Thioketone spin traps as mediating agents for free radical polymerization processes", *Chem. Commun.*, 2006, (2006), 835-837.

Trumbo, D. L, et al., "The copolymerization behavior of acrylate dimers: Copolymers of methyl, ethyl, and n-butyl acrylate dimers", *J. Polym. Sci., Part A*, 29(7), (1991), 1053-1059.

Watanabe, Y., et al., "Addition-Fragmentation Chain Transfer in Free Radical Styrene Polymerization in the Presence of 2,4-Diphenyl-4-methyl-1-pentene", *Chem. Lett.*, 22 (1993), 1089-1092.

Wayland, B. B., et al., "Degenerative Transfer and Reversible Termination Mechanisms for Living Radical Polymerizations Mediated by Cobalt Porphyrins", *Macromolecules*, 39(24), (2006), 8219-8222.

Webster O. W., "Group Transfer Polymerization", *Encyclopedia of Polymer Science and Engineering*, vol. 7, H. F. Mark, et al., Eds., John Wiley & Sons, New York, NY, (1987), 580-588.

Webster, O. W., "Group Transfer Polymerization: A Critical Review of Its Mechanism and Comparison with Other Methods for Controlled Polymerization of Acrylic Monomers", *Adv. Polym. Sci.*, 167, (2004), 1-34.

Wieland, P. C, et al., "A New Additive for Controlled Radical Polymerization", *Macromolecular Rapid Communications*, 22(9), (2001), 700-703.

Yamada, B., et al., "Introduction of 2-Methoxycarbonylallyl End Group by Copolymerization of Methyl α-(Phenoxymethyl)acrylate Accompanying with Addition-Fragmentation Reaction", *J. Polym. Sci., Part A*, 31(6), (1993), 1551-1559.

Yamada, B., et al., "Preparation of Polymers with Substituted Allyl End Group Using Dimer of a-Methylvinyl Monomer as Addition Fragmentation Chain Transfer Agent at High Temperatures", *J. Polym. Sci., Part A*, 32(14), (1994), 2745-2754.

Yamada, B., "Substituted Propenyl End Groups as Reactive Intermediates in Radical Polymerization", *J. Pol in Sci., Part A*, 41(5), (2003), 645-654.

Zetterlund, Per B, et al., "Addition-Fragmentation Chain Transfer Involving Dimers of α-Methylvinyl Monomers Studied by ESR Spectroscopy: Competition between Fragmentation and Bimolecular Termination", *Macromol. Rapid Commun.*, 24(2), (2003), 197-201.

\* cited by examiner

COPOLYMERS WHICH CAN BE OBTAINED FROM URETHANE-BASED, POLYSILOXANE-CONTAINING MACROMONOMERS, PROCESSES FOR THE PREPARATION THEREOF AND THEIR USE

PRIORITY CLAIM TO RELATED APPLICATIONS

This application is a national stage application under 35 U.S.C. §371 of PCT/EP2011/070367, filed Nov. 17, 2011, and published as WO 2012/066084 A1 on May 24, 2012, which claims priority to European Application No. 10191564.3, filed Nov. 17, 2010, which applications and publication are incorporated by reference as if reproduced herein and made a part hereof in their entirety, and the benefit of priority of each of which is claimed herein.

The invention relates to copolymers obtainable from urethane-based, polysiloxane-containing macromonomers, to a process for preparation thereof and to the use thereof.

STATE OF THE ART

The scientific document "Solvent-Induced Self-Assembly in Cardanol-Based Urethan Methacrylate Comb Polymers Journal of Polymer Science: Part A: Polymer Chemistry, Vol. 47, 2996-3009 (2009)" concerns comb polymers formed exclusively from macromonomers. The macromonomers here are formed from a diisocyanate, a hydroxy-functional (meth)acrylate and a cardanol-based group. These polymers served for study of the solvent-induced self-assembly of comb polymers.

In "Synthesis and Characterization of Novel Sulfobetaines Derived from 2,4-Tolylene Diisocyanate Journal of Applied Polymer Science, Vol. 82, 3447-3459 (2001)", comb polymers formed from macromonomers are examined, the macromonomers being based on a sulfo betaine structure. The sulfo betaine structures are said to be able to modify the morphology and the physical properties of the comb polymers.

WO 2005/066224 A1 describes water- and oil-repellent fluoroacrylates formed from fluorinated macromonomers. The publication "Synthesis of Polysiloxane-Grafted Fluoropolymers and Their Hydrophobic Properties, Journal of the Adhesion Society of Japan, Vol. 36 No. 6, Page 217-224 (2000)" describes comb polymers which are prepared by reaction of a hydroxy-functional fluoropolymer with a siloxane-modified isocyanate. The siloxane-modified hydroxy-functional fluoropolymers obtained in this way are crosslinked using a polyisocyanate to obtain a coating. These siloxane-modified hydroxy-functional fluoropolymers cannot be used as additives in standard industrial coating systems, such as 2K polyurethane, polyester-melamine, acrylic-melamine or acrylic-epoxide systems, since they are incompatible therewith and lead to surface defects such as crater formation. Furthermore, the use of highly fluorinated polymers frequently causes higher production costs and usually leads to problems of compatibility with other components in a coating system. Moreover, the use of fluorine and also other halogens in organic substances is controversial for environmental reasons; for example, perfluorinated substances are frequently biodegraded only extremely slowly, if at all.

WO 98/46693 A1 describes a liquid curable resin mixture composed of various polysiloxane macromonomers with urethane acrylates. In this case, the various macromonomers and urethane acrylates are first prepared separately from one another, then mixed to give a liquid curable composition and, after application to a substrate, cured to give a coating, for example by means of UV radiation. The production of the macro-monomers and of the urethane acrylates generates bifunctional monomers which cure to give a crosslinked coating in the course of curing of the resin mixture applied. Significant crosslinking generates a very high molecular weight of the product. The polysiloxane macromonomers described cannot be used as additives in standard industrial UV coating systems, since they are incompatible therewith and lead to surface defects such as crater formation.

With regard to cosmetic compositions, EP 0931537 B1 describes the dispersion of organic and inorganic powders in oil-containing compositions with the aid of polysiloxane-containing compounds. The polymers are prepared by free-radical copolymerization of vinylic polysiloxane macromonomers with other vinylic monomers, the other vinylic monomers containing a nitrogen-containing group, a polyoxyalkylene group, an anionic group or a polylactone group.

U.S. Pat. No. 6,362,274 B1 describes grafted polymers containing at least three sequences of different chemical nature. At least one sequence has hydrophobic character, at least one sequence hydrophilic character, and at least one sequence is an anchor group to solid particles. These polymers are used as dispersants for solid particles in aqueous or organic media.

Problem

The problem addressed by the present invention was that of providing copolymers and a process for preparation thereof. These copolymers are to be obtainable by free-radical copolymerization of urethane-based, siloxane-containing macromonomers and further comonomers, and they are to be suitable for use as additives in coating materials and/or plastics. These preparation processes are to give macromonomers and copolymers thereof with very well-defined structure, low crosslinking and a minimum level of by-products, and the copolymers are to have good compatibility with industrial coating systems. In addition, the copolymers are to be preparable by a "grafting to" process.

Since halogen- and particularly fluorine-containing organic substances, particularly fluorotelomers, such as perfluorinated alkyl components having a chain length of ≥8 carbon atoms, are usually classified as hazardous to the environment, it is additionally desirable for the copolymers to be very substantially free of fluorine or at best free of any halogens. As well as the aspect of environmental controversy of halogen- and fluorine-containing organic substances, these substances additionally have usually relatively poor compatibility with coating systems. Moreover, the use of fluorine-containing organic substances causes higher costs. It is therefore desirable overall for fluorine or else other halogens not to be used. However, it is not absolutely necessary for solution of the problem that the copolymers provided are free of fluorine or even, as the case may be, free of any halogens.

The use of the novel copolymers as additives is to alter the properties of the coating materials or coatings and/or plastics in a controlled manner. The additives are to be suitable as leveling agents and are to improve the leveling, gloss and/or opalescence of the coating materials or coatings, or plastics. Moreover, the copolymers are to be able to modify the surface of the coating materials or coatings and/or the plastics, such that it is possible to achieve, for example, soil-, water- and/or oil-repellent surfaces. In order, for example, to avoid wettability of such substrate surfaces, the surface energy of the substrates has to be reduced by the use of these additives.

Furthermore, the additives added to impart these improved properties are as far as possible not to impair the other properties of the coating materials or coatings, polymeric molding compounds or thermoplastics, such as corrosion protection or weathering resistance. The additives added are also to be able to display their efficacy in relatively small amounts. The coatings, polymeric molding compounds and thermoplastics are additionally to retain their improved surface properties over a long period of several years. This should also include the permanence of the effects, for example of the anti-adhesive and/or soil-repellent effect, over several cleaning cycles.

In addition, the copolymers of the present invention are to be suitable as wetting agents and dispersants, in particular for the production of homogeneous dispersions such as pigment and filler preparations. Compared to the prior art, there is still a need for improved systems to lower the sedimentation of pigments and fillers and to ensure broader compatibility of copolymers with regard to different compositions, such as compatibility with very nonpolar compositions such as oil- and silicone-based formulations.

In addition, coating materials or coatings, plastics (i.e. polymeric molding compounds and thermoplastics) and homogeneous dispersions, such as pigment and filler preparations, are to be provided, these having such improved properties.

Solution

The problem is surprisingly solved by a (meth)acrylate copolymer obtainable by free-radical copolymerization of one or more urethane-based, polysiloxane-containing macromonomers and at least one or more than one further free-radically polymerizable monomers, wherein the macromonomer(s) is/are obtainable by reaction of at least
one hydroxy-functional (meth)acrylate
and at least one
polysiloxane-, polyether-polysiloxane-, polyester-polysiloxane- or polyether/polyester-polysiloxane-modified isocyanate,
optionally in the presence of a catalyst for formation of the urethane bond and of at least one inhibitor of free-radical polymerization, and in that at least 85% of the monomers used for preparation of the copolymer have only one free-radically polymerizable double bond.

The preparation can be effected by the macromonomer method or by the "grafting to" method.

The macromonomer method is a process for preparing a (meth)acrylate copolymer whereby one or more macromonomers obtainable by reaction of at least
one hydroxy-functional (meth)acrylate
and at least one
polysiloxane-, polyether-polysiloxane-, polyester-polysiloxane- or polyether/polyester-polysiloxane-modified isocyanate,
optionally in the presence of a catalyst for formation of the urethane bond and of at least one inhibitor of free-radical polymerization, and one or more further free-radically polymerizable comonomers are free-radically copolymerized, at least 85% of the monomers used to prepare the copolymer having only one free-radically polymerizable double bond, and the polysiloxane-, polyether-polysiloxane-, polyester-polysiloxane- or polyether/polyester-polysiloxane-modified isocyanate used having been purified.

The "grafting to" method is a process for preparing a (meth)acrylate copolymer whereby the (meth)acrylate copolymer is obtainable by reacting one or more urethane-based components of a polysiloxane-, polyether-polysiloxane-, polyester-polysiloxane- or polyether/polyester-polysiloxane-modified isocyanate with a hydroxy-functional (meth)acrylate copolymer formed from at least one hydroxy-functional (meth)acrylate monomer and one or more further free-radically polymerizable comonomers, optionally in the presence of a catalyst for formation of the urethane bond, at least 85% of the monomers used for preparation of the hydroxy-functional (meth)acrylate copolymer having only one free-radically polymerizable double bond.

The (meth)acrylate copolymers are suitable for use as additives in coating materials and plastics. They are also suitable as wetting agents and dispersants, in particular for the production of homogeneous dispersions such as pigment and filler preparations.

DETAILED DESCRIPTION OF THE INVENTION

Macromonomers are oligomers or polymers having at least one functional end group through which polymerization reactions can proceed. Macromonomers are thus macromolecular monomers which can be converted to homo- or copolymers of defined structures. For example, macromonomers having an ethylenically unsaturated end group can be converted by free-radical polymerization to comb polymers having a defined length of the side chains. Comb polymers are also preparable from linear chains containing functional groups onto which side chains have been grafted or introduced by polymer-analogous reactions.

The notation "(meth)acrylate" encompasses both acrylates and methacrylates. The notation "(meth)acrylate polymer or copolymer" is intended to mean that the polymer/copolymer (polymer skeleton/backbone) is formed predominantly, i.e. more than 50% of the monomer units used, from monomers having a (meth)acrylate group. In the preparation of a (meth)acrylate copolymer, more than 50% of the monomers thus have a (meth)acrylate group. However, the intention is not to rule out the possibility that other free-radically polymerizable monomer units can also be incorporated, for example styrene or vinyl-functional monomers.

An inventive copolymer is a copolymer obtainable by free-radical copolymerization of one or more urethane-based, polysiloxane-containing macromonomers and at least one or more than one further free-radically polymerizable monomer, wherein the copolymer is a (meth)acrylate copolymer and the macromonomer(s) is/are obtainable by reaction of at least
one hydroxy-functional (meth)acrylate
and at least one
polysiloxane-, polyether-polysiloxane-, polyester-polysiloxane- or polyether/polyester-polysiloxane-modified isocyanate,
optionally in the presence of a catalyst for formation of the urethane bond and of at least one inhibitor of free-radical polymerization, and additionally at least 85% of the monomers used for preparation of the copolymer have only one free-radically polymerizable double bond.

Preferably, the reaction of the at least one hydroxy-functional (meth)acrylate with the at least one polysiloxane-, polyether-polysiloxane-, polyester-polysiloxane- or polyether/polyester-polysiloxane-modified isocyanate is effected in equal molar amounts or with a molar excess of the hydroxy-functional (meth)acrylate. Preferably, the reaction is effected in a molar ratio of 4:1 to 1:1, the molar ratio being the ratio of the hydroxy-functional (meth)acrylates used to the polysiloxane-, polyether-polysiloxane-, polyester-polysiloxane- or polyether/polyester-polysiloxane-modified isocyanates used.

A preferred embodiment is a copolymer in which the at least one hydroxy-functional (meth)acrylate has the general formula (I):

U-L-O—H  (I)

where U is an ethylenically unsaturated, free-radically polymerizable head group having acryloyl [$H_2C=CH—C(=O)—O—$] or methacryloyl [$H_2C=C(CH_3)—C(=O)—O—$] structure.

L is a divalent organic radical which does not contain any free-radically polymerizable groups. Free-radically polymerizable groups are understood to mean functional groups which can be free-radically polymerized under the conditions customary therefor, for example ethylenically unsaturated groups. Preferably, L is selected from the group consisting of alkylene radicals, polyester radicals and polyalkylene oxide radicals.

More preferably, L is selected from the group consisting of alkylene radicals having 2-5 carbon atoms, polyester radicals having 2-5 caprolactone units, polyethylene oxide radicals having 2-5 ethylene oxide units, polypropylene oxide radicals having 2-5 propylene oxide units, and mixed polyethylene oxide/polypropylene oxide radicals having 2-5 alkylene oxide units.

Most preferably, L is an alkylene radical having 2-5 carbon atoms.

The starter molecule U-L-O—H is preferably selected from the group consisting of hydroxyalkyl esters of methacrylic acid [$H_2C=C(CH_3)—C(=O)—O—(CH_2)_a—OH$] and polyethylene oxide esters of methacrylic acid [$H_2C=C(CH_3)—C(=O)—O—(CH_2—CH_2—O)_a—H$] where $a=1-20$, preferably $a=1-10$ and more preferably $a=2-5$.

Most preferably, the starter molecule U-L-O—H is hydroxyethyl methacrylate or hydroxybutyl methacrylate.

In a further preferred embodiment, the at least one polysiloxane-, polyether-polysiloxane-, polyester-polysiloxane- or polyether/polyester-polysiloxane-modified isocyanate has the general formula (II)

in which all $R^1$ and $R^2$ are independently of one another H, alkyl and/or aryl, preferably H, X is alkylene, cycloalkylene and/or aralkylene, preferably the radical of a diisocyanate without the NCO groups, all Y are alkylene and/or cycloalkylene, n and m are independent of one another, where the sum of n+m=0 to 100, $R^a$ is a saturated linear alkyl radical having 1 to 30 carbon atoms, a saturated branched or cyclic alkyl radical having 3 to 30 carbon atoms, or an aryl radical, an alkylaryl radical or an arylalkyl radical having 6 to 30 carbon atoms, preferably a methyl radical or a butyl radical, all $R^b$ and $R^c$ are independently of one another saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals or arylalkyl radicals having 6 to 12 carbon atoms, preferably methyl, ethyl, propyl, butyl, phenyl or substituted phenyl radicals, more preferably methyl radicals, all $R^d$ and $R^e$ are independently of one another $R^a[SiR^bR^cO]_s$, where $R^a$, $R^b$ and $R^c$ are each as defined above and are selected independently of one another, saturated linear alkyl radicals having 1 to 6 carbon atoms, saturated branched or cyclic alkyl radicals having 3 to 6 carbon atoms, alkene radicals having 2 to 6 carbon atoms, or aryl radicals, alkylaryl radicals or arylalkyl radicals having 6 to 12 carbon atoms, preferably methyl, ethyl, propyl, butyl, phenyl or substituted phenyl radicals, more preferably methyl radicals, $s=1$ to 400 and $t=2$ to 30, preferably $s=4$ to 200 and $t=3$ to 6.

The isocyanate used preferably comprises aliphatic, cycloaliphatic or araliphatic isocyanates. For example, aryl-substituted aliphatic diisocyanates as described in Houben-Weyl, Methoden der Organischen Chemie [Methods of Organic Chemistry], volume 14/2, pages 61-70, and in an article by W. Siefken, Justus Liebig's Annalen der Chemie 562, pages 75-136, are used. Preferred examples are ethylene 1,2-diisocyanate, tetramethylene 1,4-diisocyanate, hexamethylene 1,6-diisocyanate (HDI), 2,2,4-(2,4,4)-trimethylhexamethylene 1,6-diisocyanate (TMDI), 1,9-diisocyanato-5-methylnonane, 1,8-diisocyanato-2,4-dimethyloctane, dodecane 1,12-diisocyanate, ω,ω'-diisocyanatopropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-1,4-methanonaphthalen-2(or 3),5-ylene-dimethylene diisocyanate, hexahydro-4,7-methanoindan-1(or 2),5(or 6)-ylenedimethylene diisocyanate, hexahydro-4,7-methanoindan-1(or 2),5(or 6)-ylene diisocyanate, hexahydrotolylene 2,4- and/or 2,6-diisocyanate (H6-TDI), tolylene 2,4- and/or 2,6-diisocyanate (TDI), perhydro-2,4'-diphenylmethane diisocyanate, perhydro-4,4'-diphenylmethane diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-

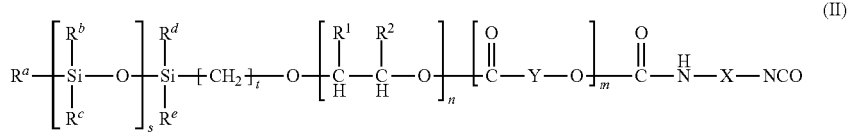

(II)

diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, and any mixture of these compounds. Further preferred isocyanates are described in said article by Siefken on page 122 ff. 2,5(2,6)-Bis(isocyanatomethyl)bicyclo[2.2.1]heptane (NBDI) is preferred in pure form or as part of a mixture. Particular preference is given to the industrially easily obtainable aliphatic and cycloaliphatic isocyanates and the isomer mixtures thereof.

Most preferably, X corresponds to the component group of tolylene 2,4-diisocyanate, tolylene 2,6-diisocyanate, or isomer mixtures of tolylene 2,4-diisocyanate and tolylene 2,6-diisocyanate, or isophorone diisocyanate (IPDI) without the NCO groups.

Preferably, the modified isocyanates are polysiloxane-modified isocyanates of the formula (IIa), polyether-polysiloxane-modified isocyanates of the formula (IIb) or polyester-polysiloxane-modified isocyanates of the formula (IIc)

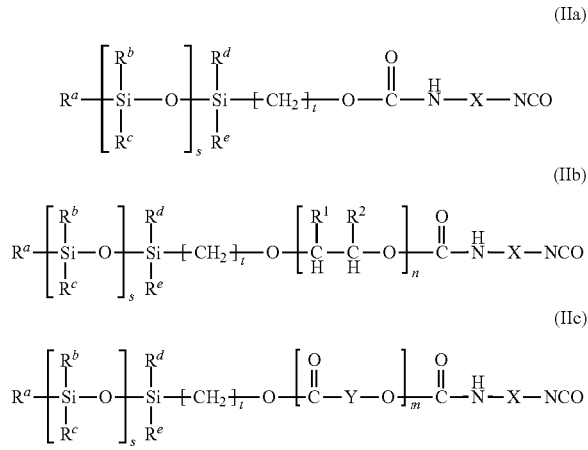

where $R^1$, $R^2$, X, Y, $R^a$, $R^b$, $R^c$, $R^d$, $R^e$, n, m, s and t are each as defined above.

Preferably, X corresponds to the component group of tolylene 2,4-diisocyanate, tolylene 2,6-diisocyanate, or isomer mixtures of tolylene 2,4-diisocyanate and tolylene 2,6-diisocyanate, or isophorone diisocyanate (IPDI) without the NCO groups, and m=1 to 100 and n=1 to 100. More preferably, m=2 to 100, n=2 to 100, s=4 to 200 and t=3 to 6.

The inventive copolymer is obtained by a free-radical copolymerization of at least one of the urethane-based, polysiloxane-containing macromonomers described with at least one further monomer. At least 85% of the monomers used have only one free-radically polymerizable double bond. Preferably, at least 90% of the monomers used have only one free-radically polymerizable double bond, preferably at least 95%, more preferably at least 98% and most preferably at least 99%. The preferred amounts of monomers having only one free-radically polymerizable double bond find use particularly for the copolymers which are added as additives to coatings and plastics for surface modification.

The (meth)acrylate copolymer preferably has a weight-average molecular weight of 2000 to 100 000 g/mol, preferably 5000 to 75 000 g/mol and more preferably 10 000 to 50 000 g/mol. An appropriate molecular weight improves the handling and compatibility of the copolymers, particularly for use as an additive which can then be used as a liquid additive. If the copolymers are to be used as wetting agents and dispersants, the weight-average molecular weight is preferably 20 000 to 100 000 g/mol. The weight-average molecular weight of the copolymers is determined by means of gel permeation chromatography with tetrahydrofuran as the eluent using polystyrene standards.

Preferably, not more than 5% of the polymerized monomers contain fluorine, preferably not more than 2%, and more preferably none of the polymerized monomers contains fluorine. Preferably, not more than 5% of the polymerized monomers contain a halogen, preferably not more than 2%, and more preferably none of the polymerized monomers contains a halogen. The omission of fluorine or else other halogens can firstly save costs, but it is more important that this enhances the compatibility of the copolymers and lowers environmental pollution.

Preferably, the copolymer is formed to an extent of 0.2-95% by weight, based on the total weight of all macromonomers and comonomers used, from polymerized macromonomers.

In addition, it is preferable that the copolymer is formed to an extent of 0.2-30% by weight, more preferably to an extent of 0.5-20% by weight and most preferably to an extent of 1-15% by weight, based in each case on the total weight of all macromonomers and comonomers used, from polymerized macromonomers, particularly for the preferred use of the copolymers as surface-modifying additives in coatings and plastics. This content of macromonomers gives the best properties of the copolymers with regard to use as additives for coating systems and plastics for improving leveling and the surface-modifying action, for example the soil-, water- and/or oil-repellent action.

Moreover, it is preferable that the copolymer is formed to an extent of 40-95% by weight, more preferably to an extent of 70-95% by weight, based in each case on the total weight of all macromonomers and comonomers used, from polymerized macromonomers, particularly for the preferred use of the copolymers as wetting agents and dispersants in homogeneous dispersions, such as pigment and filler preparations.

The macromonomers are preferably obtained by purifying the polysiloxane-, polyether-polysiloxane-, polyester-polysiloxane- or polyether/polyester-polysiloxane-modified isocyanates used, preferably by means of a thin-film evaporator. This increases the purity of the macromonomer units, as a result of which the structure of the resulting copolymers is better defined.

Preferred further free-radically polymerizable comonomers are selected from the group consisting of acrylic acid, methacrylic acid, methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate, isobornyl methacrylate, hydroxyethyl acrylate, hydroxyethyl methacrylate, styrene, [alpha]-methylstyrene, acrylonitrile, triethylene glycol monoacrylate, triethylene glycol monomethacrylate, ethyl vinyl ether, butyl vinyl ether, hydroxyalkyl vinyl ethers such as hydroxybutyl vinyl ether, cyclohexyl vinyl ether, vinyl acetate, polyethylene glycol monoacrylate, polyethylene glycol monomethacrylate.

Preferably, the copolymers are obtained by free-radical copolymerization of one or more urethane-based, polysiloxane-containing macromonomers and at least one or more than one further free-radically polymerizable monomer.

Macromonomer Method:

The macromonomer method is a process for preparing a (meth)acrylate copolymer whereby one or more macromonomers obtainable by reaction of at least
one hydroxy-functional (meth)acrylate
and at least one
polysiloxane-, polyether-polysiloxane-, polyester-polysiloxane- or polyether/polyester-polysiloxane-modified isocyanate,
optionally in the presence of a catalyst for formation of the urethane bond and of at least one inhibitor of free-radical polymerization, and one or more further free-radically polymerizable comonomers are free-radically copolymerized, at least 85% of the monomers used to prepare the copolymer having only one free-radically polymerizable double bond, and the polysiloxane-, polyether-polysiloxane-, polyester-polysiloxane- or polyether/polyester-polysiloxane-modified isocyanate used having been purified.

Preferably, the reaction of the at least one hydroxy-functional (meth)acrylate with the at least one polysiloxane-, polyether-polysiloxane-, polyester-polysiloxane- or polyether/polyester-polysiloxane-modified isocyanate is effected in equal molar amounts or with a molar excess of the hydroxy-functional (meth)acrylate. Preferably, the reaction is effected in a molar ratio of 4:1 to 1:1, the molar ratio being the ratio of the hydroxy-functional (meth)acrylates used to the polysiloxane-, polyether-polysiloxane-, polyester-polysiloxane- or polyether/polyester-polysiloxane-modified isocyanates used.

Preferably, the hydroxy-functional (meth)acrylates have the above-specified general formula (I).

Preferably, the polysiloxane-, polyether-polysiloxane-, polyester-polysiloxane- or polyether/polyester-polysiloxane-modified isocyanates have a structure of the above-specified general formula (II).

The polysiloxane-, polyether-polysiloxane-, polyester-polysiloxane- or polyether/polyester-polysiloxane-modified isocyanates are preferably prepared by the processes as described in DE 199 19 482 A1. To this end, monohydroxyl compounds are reacted with an excess of diisocyanate, preferably tolylene diisocyanate, and the unconverted fraction of the diisocyanate is removed again from the reaction mixture, preferably by a purification by means of a thin-film evaporator. An excess of diisocyanate is needed to avoid coupling products (diadducts) via two urethane bonds. Such non-NCO-functional diadducts cannot be reacted any further and cannot be polymerized subsequently in the polymerization process. Particularly in the case of polysiloxane components, the coupling products in paint systems can lead to turbidity and defects. Thus, it is made possible to obtain copolymers with comb structure in a subsequent free-radical copolymerization of the macromonomers with other monomers.

As is well known, however, chemical syntheses regularly give rise to by-products. Small proportions of residual diisocyanate from the preceding stage (preparation process for components of the formula (II)) in the synthesis of the macromonomers can therefore form monomers having two free-radically polymerizable groups (product of two starter molecules of the formula (I) U-L-O—H and a diisocyanate). These by-products, and also residual diisocyanate, can lead to crosslinking during the polymerization process. The preparation process for the components of the formula (II) (excess of diisocyanates compared to the starter molecule and purification of the reaction mixture, for example with a thin-film evaporator), however, can keep the proportions of such by-products very low. Preferably, the macromonomers therefore have only very small proportions, more preferably none, of residual diisocyanates and of molecules having two free-radically polymerizable groups.

The preparation of the macromonomers by urethane formation between the components is preferably effected in the presence of one or optionally more than one catalyst, preferably between 0° C. and 100° C., preferably at about 20° C. to 85° C.

Suitable catalysts for formation of the urethane bond are, for example, tertiary amines such as triethylamine, triethylenediamine, n-methylpyridine and n-methylmorpholine, metal salts such as tin octoate, lead octoate and zinc stearate, and organic metal compounds such as dibutyltin dilaurate.

The macromonomers are prepared in the presence of an inhibitor of free-radical polymerization. Examples of suitable inhibitors of free-radical polymerization are hydroquinone, hydroquinone monomethyl ether, 4-hydroxy-2,2,6,6-tetramethyl-1-piperidinyloxy (4-hydroxy-TEMPO) or phenothiazines. The inhibitor of free-radical polymerization is used to scavenge free radicals which possibly form during the thermally promoted urethane formation or in the course of storage of the macromonomers, such that the stability of the ethylenically unsaturated, free-radically polymerizable head group U of the starter molecule is ensured. It is thus an advantage of the use of an inhibitor of free-radical polymerization that the reaction is facilitated and a lower level of by-products such as homooligomers or homopolymers occurs.

It is possible to use solvents. However, these must not affect the urethane formation. Examples of suitable solvents are those which do not contain any active hydrogen atoms which could react with the isocyanate group. Preference is given to using aliphatic, cycloaliphatic, aromatic solvents, ketones and cyclic ethers, as solvents. The choice of solvent is also guided by the later end use of the inventive copolymer to be synthesized subsequently from the macromonomers. Preference is given to using low-boiling solvents in order to facilitate the distillative removal.

At the end of the reaction, the product is cooled. Solvents and polymerization inhibitors can be removed if required prior to the subsequent free-radical copolymerization by suitable distillation or filtration measures.

The inventive copolymers are obtainable from the macromonomers and further comonomers by free-radically polymerizing at least one of the macromonomers and one or more further free-radically polymerizable comonomers. For preparation of the inventive copolymers, one or more different macromonomers can be free-radically copolymerized with other comonomers.

As well as the macromonomers which are obtained by reaction of at least one hydroxy-functional (meth)acrylate, it is also possible to use macro-monomers which are obtained by reaction of another hydroxy-functional molecule having a polymerizable group with at least one polysiloxane-, polyether-polysiloxane-, polyester-polysiloxane- or polyether/polyester-polysiloxane-modified isocyanate. Such macromonomers are obtained, for example, when a hydroxyalkyl vinyl ether such as hydroxybutyl vinyl ether is used rather than the hydroxy-functional (meth)acrylate in the preparation of the macromonomer.

One or more free-radically polymerizable comonomers other than the above-described macromonomer(s) are used. Free-radically polymerizable comonomers are understood to mean those compounds which bear at least one free-radically polymerizable group. Free-radically polymerizable groups are understood to mean functional groups which can be free-radically polymerized under conditions customary therefor, for example ethylenically unsaturated groups. This ethylenically unsaturated group is preferably selected from the group consisting of substituted or unsubstituted acryloyl, methacryloyl, styryl, alpha-methylstyryl, allyl, vinyl-benzyl, vinyl ether, vinyl ester and vinyl ketone groups.

Particularly preferred monomer units of the base molecule in the free-radical polymerization are selected from the group consisting of alkenes having 2 to 30 carbon atoms and arylalkenes having 8 to 30 carbon atoms, alkyl acrylates and alkyl methacrylates of straight-chain alcohols having 1 to 22 carbon atoms or branched or cycloaliphatic alcohols having 3 to 22 carbon atoms, aralkyl acrylates and aralkyl methacrylates of aralkyl alcohols having 8 to 18 carbon atoms, maleic esters, itaconic esters and fumaric esters of straight-chain alcohols having 1 to 22 or branched or cycloaliphatic alcohols having 3 to 22 carbon atoms, hydroxyalkyl (meth)acrylates of straight-chain diols having 2 to 36 carbon atoms or branched or cycloaliphatic diols having 3 to 36 carbon atoms, vinyl alkanoates having 2 to 30 carbon atoms, styrenes and substituted styrenes, alpha-methylstyrenes and substituted alpha-methylstyrenes, alkyl vinyl ethers, fluorinated and fluorine-free alkyl esters of methacrylic acid, of maleic acid, of fumaric acid, of itaconic acid and of mesaconic acid (methylfumaric acid), methacrylic acid, acrylic acid, vinyl esters, vinyl ethers, hydroxy-functional alkyl vinyl ethers and vinyl ketones having 3 to 20 carbon atoms, vinyltrialkoxysilanes having 5 to 8 carbon atoms and methacryloyloxypropyltrialkoxysilanes having 10 to 16 carbon atoms.

The nonfunctional monomers used may, for example, be methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate, isobornyl methacrylate, styrene, alpha-methylstyrene. Preference is given to using esters of (meth)acrylic acid with alkanols, for example with monohydroxyalkanes having 1 to 14 carbon atoms, as comonomers.

The functional monomers used in the copolymers may, for example, be hydroxy-functional or carboxy-functional monomers which can crosslink with reactive groups of the binder and thus ensure a permanent effect. In order to control crosslinking of the resulting hydroxy-functional leveling agents with, for example, acrylic-melamine-formaldehyde resins, it is also possible to react some or all of these hydroxyl groups with isocyanates to give secondary carbamate groups, such that the crosslinking of the overall system leaves the leveling agent enough time to approach the interface, to display its effect there and, after a certain time delay, to react with the melamine-formaldehyde resin. Moreover, it was also found to be particularly advantageous that the hydroxyl groups of the monomer units in the inventive copolymers can crosslink with reactive groups of the binder and thus ensure a permanent effect.

Examples of hydroxy-functional monomers include:

hydroxyalkyl (meth)acrylates of straight-chain diols having 2 to 36 carbon atoms or branched or cycloaliphatic diols having 3 to 36 carbon atoms, for example 2-hydroxyethyl (meth)acrylate, 3-hydroxypropyl (meth)acrylate, 4-hydroxybutyl (meth)acrylate, 3,4-dihydroxybutyl (meth)acrylate, 2-hydroxypropyl (meth)acrylate, 2,5-dimethyl-1,6-hexanediol mono(meth)acrylate, polyethylene glycol mono (meth)acrylate, polypropylene glycol-ethylene glycol mono (meth)acrylate and hydroxyalkyl vinyl ethers, for example hydroxybutyl vinyl ether.

Further suitable monomers are caprolactone- and/or valerolactone-modified hydroxyalkyl acrylates and caprolactone- and/or valerolactone-modified hydroxyalkyl methacrylates having a weight-average molecular weight between 220 and 1200 g/mol, the hydroxyl (meth)acrylates preferably being derived from straight-chain diols having 2 to 8 carbon atoms or branched or cycloaliphatic diols having 3 to 8 carbon atoms.

Preferably, the copolymers have free OH groups. More preferably, the copolymers have an OH number of 5-200 mg KOH/g, very preferably of 10-100 mg KOH/g. The preferred OH numbers specified are preferably possessed by the copolymers which are used as surface-modifying additives in coatings and plastics. In addition, the copolymers may preferably also have no free OH groups, particularly when the copolymers are used for the preferred use as wetting agents and dispersants.

After the copolymerization, the hydroxyl groups can subsequently be modified by polymer-analogous reactions. For example, the subsequent reaction with maleic anhydride can incorporate a reactive double bond and acid function. It is also possible to esterify free OH groups by, for example, subsequent reaction with acetic anhydride, in order to be able to better avoid potential intermediate layer adhesion problems when the copolymers are used as leveling aids in paints.

In addition, the subsequent transesterification (chemical or enzymatic transesterification) with hydroxy-functional (meth)acrylates can give products which can also be incorporated permanently into paint systems in radiation-curing processes, such as UV ray and electron beam curing.

Examples of carboxy-functional monomers include: acrylic acid, methacrylic acid, maleic acid, fumaric acid and itaconic acid.

Further examples of functional monomers are epoxy-functional and silane-functional comonomers: the use of epoxy-functional comonomers, for example glycidyl acrylate and glycidyl methacrylate, such as glycidoxy-propyl acrylate or glycidoxypropyl methacrylate, or silane-functional comonomers such as vinyltriethoxysilane and methacryloyloxypropyltrimethoxysilane, can give copolymers which self-crosslink in a controlled manner.

Ionic groups can be introduced into the copolymer as a corresponding ionic, ethylenically unsaturated monomer, or can be obtained subsequently by polymer-analogous reactions, for example salt formation.

For example, it is possible to react acid functions in the copolymer, for example carboxylic acids and phosphoric esters, with bases. It is additionally possible, proceeding from acid anhydrides, for example maleic anhydride, first to generate the carboxylic acid function by hydrolysis with water or formation of a monoester or partial ester with monohydric alcohols or polyethers, and then to react this with bases.

Oxirane structures in the copolymer can be reacted with nucleophiles such as o-phosphoric acid and then converted to salts with bases to give ionic groups.

Hydroxyl functionalities in the copolymer can be reacted with polyphosphoric acid to give phosphoric esters with subsequent conversion to salts with bases to give ionic groups.

Suitable bases are, for example, amines, for example dimethylaminoethanol, diethanolamine, triethanolamine, 2-(dimethylamino)propan-1-ol, triethylamine, butylamine and dibutylamine, hydroxides, oxides, carbonates and hydrogencarbonates of metals of main groups 1 to 3 of the Periodic Table of the Elements, for example sodium hydroxide, potassium hydroxide, aluminum hydroxide and sodium hydrogencarbonate.

Examples of ionic, ethylenically unsaturated monomers are, for example, salts of acrylic acid, methacrylic acid, maleic acid or styrenesulfonic acid.

For free-radical polymerization of the urethane-based macromonomer(s), one or more comonomers are used. The copolymer is preferably formed to an extent of 0.2-95% by weight, based on the total weight of all macromonomers and comonomers used, from polymerized macro monomers.

In addition, it is preferable that the copolymer is formed to an extent of 0.2-30% by weight, more preferably to an extent of 0.5-20% by weight and most preferably to an extent of 1-15% by weight, based in each case on the total weight of all macromonomers and comonomers used, from polymerized macromonomers, particularly for the preferred use of the copolymers as surface-modifying additives in coatings and plastics. This content of macromonomers gives the best properties of the copolymers with regard to use as additives for coating systems and plastics for improving leveling and the surface-modifying action, for example the soil-, water- and/or oil-repellent action.

Moreover, it is preferable that the copolymer is formed to an extent of 40-95% by weight, more preferably to an extent of 70-95% by weight, based in each case on the total weight of all macromonomers and comonomers used, from polymerized macromonomers, particularly for the preferred use of the copolymers as wetting agents and dispersants in homogeneous dispersions, such as pigment and filler preparations.

The inventive copolymers can be prepared by free-radical polymerization in a manner known to those skilled in the art in organic solvents or in bulk, in the presence of free-radical initiators such as peroxides or azo compounds. Useful solvents include especially esters, for example ethyl acetate, n-butyl acetate or 1-methoxy-2-propyl acetate, and aromatic solvents, for example toluene or xylene, and ketones, for example methyl isobutyl ketone or methyl ethyl ketone. The choice of solvent is also guided by the later end use of the copolymer. Preference is given to using low-boiling solvents in order to facilitate the distillative removal of the solvents in the case of applications in which the copolymers are to be used as a 100% product, for example in UV-curing coating systems or in polymers.

The free-radical polymerization is performed at temperatures of approx. 40° C. to 180° C., preferably 60° C. to 150° C., more preferably 80° C. to 135° C.

The free-radical polymerization can be performed as a continuous or batchwise process.

The free-radical polymerization can be performed, for example, as a bulk polymerization, as a solution polymerization, as a precipitation polymerization, as an emulsion polymerization or as a suspension polymerization.

The free-radical polymerization can be performed as an uncontrolled free-radical polymerization or as a controlled free-radical polymerization.

Methods of controlled free-radical polymerization make it possible to achieve better-defined polymer architectures having a narrower molecular weight distribution. It is possible to use the methods known to those skilled in the art for controlled free-radical polymerization, for example ATRP (atom transfer radical polymerization), GTP (group transfer polymerization), NMP (nitroxide mediated polymerization), RAFT (reversible addition fragmentation chain transfer process) or MADIX (macromolecular design via the interchange of xanthates).

Controlled polymerization processes include, in particular, the "reversible addition fragmentation chain transfer process" (RAFT), which, in the case of use of particular polymerization regulators, is also referred to as "MADIX" (macromolecular design via the interchange of xanthates) and "addition fragmentation chain transfer". RAFT is described, for example, in Polym. Int. 2000, 49, 993, Aust. J. Chem 2005, 58, 379, J. Polym. Sci. Part A: Polym. Chem. 2005, 43, 5347, Chem. Lett. 1993, 22, 1089, J. Polym. Sci., Part A 1989, 27, 1741 and 1991, 29, 1053 and 1993, 31, 1551 and 1994, 32, 2745 and 1996, 34, 95 and 2003, 41, 645 and 2004, 42, 597 and 2004, 42, 6021, and also in Macromol. Rapid Commun. 2003, 24, 197 and in U.S. Pat. No. 6,291,620, WO 98/01478, WO 98/58974 and WO 99/31144.

A further process for controlled polymerization makes use of nitroxyl compounds as polymerization regulators (NMP) and is disclosed, for example, in Chem. Rev. 2001, 101, 3661.

Another controlled polymerization process is "group transfer polymerization" (GTP), as disclosed, for example, by O. W. Webster in "Group Transfer Polymerization", in "Encyclopedia of Polymer Science and Engineering", Volume 7, H. F. Mark, N. M. Bikales, C. G. Overberger and G. Menges, Eds., Wiley Interscience, New York 1987, page 580 ff., and in O. W. Webster, Adv. Polym. Sci. 2004, 167, 1-34.

Controlled free-radical polymerization using tetraphenylethane, as described, for example, in Macromol. Symp. 1996, 111, 63, is a further example of controlled polymerization.

Controlled free-radical polymerization using 1,1-diphenylethene as polymerization regulator is described, for example, in Macromolecular Rapid Communications 2001, 22, 700.

Controlled free-radical polymerization using iniferters is disclosed, for example, in Makromol. Chem. Rapid. Commun. 1982, 3, 127.

Controlled free-radical polymerization using organocobalt complexes is known, for example, from J. Am. Chem. Soc. 1994, 116, 7973, from Journal of Polymer Science: Part A: Polymer Chemistry, Vol. 38, 1753-1766 (2000), from *Chem. Rev.* 2001, 101, 3611-3659 and from *Macromolecules* 2006, 39, 8219-8222.

A further controlled polymerization technique is degenerative chain transfer using iodine compounds as described, for example, in Macromolecules 2008, 41, 6261 or in U.S. Pat. No. 7,034,085.

Controlled free-radical polymerization in the presence of thioketones is described, for example, in Chem. Commun., 2006, 835-837 and in Macromol. Rapid Commun. 2007, 28, 746-753.

The copolymers can be random copolymers, block copolymers or gradient copolymers and may be made up of two or more, hydrophilic and/or hydrophobic monomers.

The weight-average molecular weight of the copolymers is preferably in the range from 2000 to 100 000 g/mol, preferably 5000 to 75 000 g/mol, more preferably in the range from 10 000 to 50 000 g/mol. If the copolymers are to be used as wetting agents and dispersants, the weight-average molecular weight is preferably 20 000 to 100 000 g/mol. The weight-average molecular weight of the copolymers is determined by gel permeation chromatography with tetrahydrofuran as the eluent using polystyrene standards.

To influence the weight-average molecular weight and the molecular weight distribution of the copolymers, it is possible to use suitable control or chain transfer reagents. Examples include thiols such as n-octyl mercaptan, n-dodecyl mercaptan or t-dodecyl mercaptan and dimers of alpha-methylstyrene. For example, it is possible also to use small amounts of difunctional monomers (e.g. hexanediol diacrylate) in the polymerization in order to increase the molecular weight in a controlled manner.

"Grafting to" Method:

A further process for preparing the above-described copolymers is the "grafting to" method, whereby the (meth) acrylate copolymer is obtainable by reacting one or more urethane-based components of a polysiloxane-, polyether-polysiloxane-, polyester-polysiloxane- or polyether/polyester-polysiloxane-modified isocyanate with a hydroxy-functional (meth)acrylate copolymer formed from at least one hydroxy-functional (meth)acrylate monomer and one or more further free-radically polymerizable comonomers, optionally in the presence of a catalyst for formation of the urethane bond, at least 85% of the monomers used for preparation of the hydroxy-functional (meth)acrylate copolymer having only one free-radically polymerizable double bond.

In a first step, the polymer skeleton having the hydroxy-functional side groups is prepared in a free-radical copolymerization and, in a second step, the above-described polysiloxane-, polyether-polysiloxane-, polyester-polysiloxane- or polyether/polyester-polysiloxane-modified isocyanates are reacted with the hydroxy-functional polymer skeleton to form a urethane bond.

The polymer base skeleton contains at least one hydroxyl group with which the modified isocyanate can react and which originates from a polymerized hydroxy-functional (meth)acrylate. This polymerized hydroxy-functional (meth) acrylate is copolymerized with at least one or more than one of the abovementioned comonomers, 85% of the monomers used having only one free-radically polymerizable double bond. It is also possible for further hydroxy-functional comonomers to be polymerized. Preferably, as well as the at least one hydroxy-functional (meth)acrylate, hydroxyalkyl vinyl ethers, for example hydroxybutyl vinyl ether, can also be polymerized.

The polymerization is effected by one of the above-described processes, except that the hydroxy-functional copolymers obtained do not contain any of the above-described urethane-based, polysiloxane-containing macro-monomers. As well as the hydroxy-functional (meth)acrylates, further functional comonomers may also be polymerized, these having, for example, a carboxyl functionality.

The obtained copolymers having hydroxy-functional sidechains are then reacted in a second step with the polysiloxane-, polyether-polysiloxane-, polyester-polysiloxane- or polyether/polyester-polysiloxane-modified isocyanates, as a result of which the modified isocyanates are grafted onto the hydroxyl-functional copolymer to form a urethane bond. The reaction conditions, catalysts and solvents are the same as have already been described above for the preparation of the macromonomers. Preference is given to using at least one solvent. Preference is given to using the modified isocyanate in such an amount that 0.1 to 100% of the hydroxyl groups present in the polymerized hydroxy-functional (meth)acrylates are converted. Preferably, the amount of the modified isocyanate used corresponds to the amount of the modified isocyanate needed for the copolymer to be formed to an extent of 0.2-95% by weight, based on the total weight of all macromonomers and comonomers used, from polymerized macromonomers, the corresponding polymerized macro-monomers in this case forming through reaction of the modified isocyanate with the polymerized hydroxy-functional (meth) acrylates. To attain the desired content of corresponding polymerized macromonomers in the copolymer, it will be clear to the person skilled in the art what amount of hydroxy-functional (meth)acrylates have to be polymerized into the copolymer.

It is additionally preferable that the amount used corresponds to the amount of modified isocyanates, such that the copolymer is formed to an extent of 0.2-30% by weight, more preferably 0.5-20% by weight and most preferably 1-15% by weight, based in each case on the total weight of all macromonomers and comonomers used, from polymerized macro-monomers, particularly for the preferred use of the copolymers as surface-modifying additives in coatings and plastics.

Moreover, it is preferable that the amount used corresponds to the amount of modified isocyanates, such that the copolymer is formed to an extent of 40-95% by weight and more preferably 70-95% by weight, based in each case on the total weight of all macromonomers and comonomers used, from polymerized macromonomers, particularly for the preferred use of the copolymers as wetting agents and dispersants.

The free hydroxyl groups or else optionally free carboxyl groups can be functionalized further as described above, in order to introduce reactive or functional groups.

The preferred starting compounds, such as polysiloxane-, polyether-polysiloxane-, polyester-polysiloxane- or polyether/polyester-polysiloxane-modified isocyanates or hydroxy-functional (meth)acrylates, and the preferred copolymer properties, such as weight-average molecular weight, have already been specified above.

Description of the Use of the Additives

The invention further provides for the use of the copolymers as additives in coating materials, plastics or cosmetics.

Surface-Modifying Additives

Use of the Copolymers as Additives

The inventive copolymers can be used as an additive, such as a wetting agent and dispersant, leveling agent, defoamer, stabilizer or soil and oil repellent, in coating materials, plastics, cosmetics or homogeneous dispersions, such as pigment and filler preparations. Plastics are understood to mean polymeric molding compounds and thermoplastics.

The copolymers can be used, for example, as a leveling agent in coating materials, in order, for example, to improve the optical properties of the resulting coating. The use of these copolymers as a leveling agent can, for example, also improve the gloss and/or opalescence of the coating materials or coatings, or plastics.

The copolymers can also be used, for example, to alter the surface properties of coatings, polymeric molding compounds and thermoplastics. The addition of the copolymers can influence the surface energy of coatings, polymeric molding compounds and thermoplastics. The surface can be made more hydrophilic or else more hydrophobic, such that adhesion on this surface is improved or else reduced, as a result of which it is possible to obtain soil-repellent, easy-to-clean surfaces. In general, an increase in the surface energy achieves more hydrophilic surfaces which can be wetted more easily and give better adhesion conditions. In contrast, a reduction in the surface energy generally achieves more hydrophobic surfaces which are more difficult to wet and have soil-repellent, anti-adhesive properties.

Additives for Achieving Soil-Repellent, Anti-Adhesive Surfaces

The addition of the inventive copolymers to the coating materials, polymeric molding compounds and thermoplastics can achieve soil-repellent, easy-to-clean, anti-adhesive surfaces. In the corresponding copolymers, the hydrophobic silicone components lead to the properties to be achieved, while the backbone and possible relatively hydrophilic groups contribute to compatibility, although the proportion of hydrophobic groups predominates in order to achieve a soil-repellent effect. The copolymers may also, for example, contain comparatively hydrophobic groups in addition to the polysiloxane groups containing. Such copolymers typically also cause a significant reduction in surface energy.

Coating materials, polymeric molding compounds and thermoplastics to which corresponding copolymers are added have excellent anti-adhesive and soil-repellent properties. Such coating materials are preferably compositions for production of antigraffiti coatings, release coatings, self-cleaning façade coatings, ice-repellent coatings, for example for aircraft, automotive tire coatings, soil-repellent machine or instrument coatings, marine coatings (anti-fouling coatings) and soil-repellent furniture coatings and release paper coatings. Owing to the exceptionally good anti-adhesive effect of the coating materials of the present invention, it is possible to repel even oily substances, for example mineral oils, vegetable oils or oily preparations, such that correspondingly coated vessels can be freed completely of these liquids by emptying. Accordingly, the coating materials which have been provided correspondingly with the inventive additives are suitable for coating the inner surfaces of cans or vessels. Furthermore, owing to the exceptionally broad compatibility of the copolymers, these are also suitable for production of transparent coating materials.

The copolymers do not adversely affect the other properties, for example weather resistance or mechanical strength, of the coating materials or coatings, polymeric molding compounds or thermoplastics. At the same time, the inventive copolymers can be added to the coating materials, polymeric molding compounds or thermoplastics in relatively small amounts (amounts of additive). Especially in coating materials and plastics, such as polymeric molding compounds and thermoplastics, the copolymers can preferably also be used in relatively small amounts of 0.01 to 5% by weight, preferably of 0.02 to 2% by weight and more preferably of 0.03 to 1% by weight, based in each case on the overall composition of the coating material or of the overall plastic.

The physical properties of the original coating materials or coatings, polymeric molding compounds and thermoplastics, for example in relation to corrosion protection, gloss preservation and weather resistance, are not impaired by the low concentrations of the additive. Coating materials or coatings, polymeric molding compounds and thermoplastics comprising the copolymers generally exhibit the desired properties even over a period of several years, and retain these properties even over several cleaning cycles.

If the copolymers contain free hydroxyl groups, it was found to be particularly advantageous that the hydroxyl groups of the copolymers crosslink with reactive groups of the binder, and thus a permanent effect is achieved by the inventive copolymers.

Additives for Achieving Readily Wettable Surfaces

The copolymers can be added to coating materials, polymeric molding compounds and thermoplastics, such that the addition thereof increases the surface energy of the coatings, polymeric molding compounds and thermoplastics, as a result of which the wettability of these surfaces is improved. In the corresponding copolymers, the proportion of hydrophilic groups is dominant compared to the hydrophobic groups. The copolymer in this case has a hydrophilic character overall. In these copolymers, the effect of small amounts of hydrophobic polysiloxane groups is that the copolymers approach the surface of hydrophilic media, and the dominant proportion of hydrophilic groups can then lead to an increase in surface energy. Copolymers suitable for increasing the surface energy accordingly contain, in addition to the polysiloxane groups present, comparatively hydrophilic groups, for example based on alkoxylated compounds, or by virtue of a significant polyether/polyester content in the modified isocyanates.

Coatings, polymeric molding compounds and thermoplastics to which corresponding copolymers are added have surfaces of excellent wettability. Wettability can be determined by determining the contact angle of the surface with respect to water by the customary methods. For hydrophilic surfaces, the contact angle should be <60°. The copolymers do not significantly impair the other properties, for example weather resistance or mechanical strength, of the coating materials or coatings, polymeric molding compounds or thermoplastics. At the same time, these copolymers can be added to the coating materials, polymeric molding compounds or thermoplastics in relatively small amounts (amounts of additive), for example in amounts of 0.01 to 5% by weight, preferably of 0.02 to 2% by weight and more preferably of 0.03 to 1% by weight, based in each case on the overall composition of the coating material or of the overall plastic.

The physical properties of the original coating materials or coatings, polymeric molding compounds and thermoplastics are not impaired by the low concentrations of the additive, for example in respect of corrosion protection, gloss preservation and weather resistance. Coating materials or coatings, polymeric molding compounds and thermoplastics comprising the copolymers exhibit the desired properties generally even over a period of several years and retain these properties even over several cleaning cycles.

If the copolymers contain free hydroxyl groups, it has been found to be particularly advantageous that the hydroxyl groups of the copolymers can crosslink with reactive groups of the binder and thus ensure a permanent effect.

The use of the copolymers as additives in coating materials, polymeric molding compounds or thermoplastics can also give surfaces having antistatic properties or anticondensation properties. Correspondingly additized surfaces also have very good wettability and can in some cases exhibit adhesion-promoting properties in the case of overpainting.

Wetting Agents and Dispersants

The copolymers can also be used as dispersants, specifically in the fields of use of dispersants known from the prior art, with use of the inventive copolymers as dispersants in place of or together with the dispersants known from the prior art. For example, these can be used in the production or processing of paints, leather and textile dyes, pastes, pigment concentrates or cosmetic formulations, especially when these comprise solids, such as pigments and/or fillers.

In one aspect of the present invention, this relates to a process for producing a homogeneous dispersion, the process comprising the mixing of at least one pigment and/or filler in a carrier selected from the group consisting of at least one silicone oil, with the aid of at least one inventive copolymer. These dispersions are preferably pigment and/or filler preparations which are preferably used for coating systems. "Homogeneous" in this context means that no phase separation or inhomogeneity is perceptible to the naked eye. The different constituents are distributed uniformly in the homogeneous dispersion.

A further aspect of the present invention relates to a silicone-crosslinked product or coating material comprising the aforementioned homogeneous dispersion, and to a process for coating, whereby the aforementioned homogeneous dispersion and a reactive silicone are mixed and the mixture is cured to obtain a pigmented/filled silicone-crosslinked product or coating.

The reactive silicones or binders may be present in a multitude of forms and compounds, for example silicone oils, silicone with high solids, water-based silicones, silicone alkyds, siliconized polyesters, siliconized acrylic resins. The crosslinking can be effected by moisture curing, hydrosilylation curing, radiation curing or combined radiation and thermal curing (dual cure).

Pigments

Pigments are pulverulent or platelet-shaped colorants which, in contrast to dyes, are insoluble in the surrounding medium (cf. DIN 55943: 2001-10, Römpp Lexikon Lacke and Druckfarben [Römpp Lexicon of Paints and Printing Inks], Georg Thieme Verlag 1998, under Farbmittel, Farbstoffe, Pigmente [Colorants, Dyes, Pigments]).

Pigments in the context of this invention are understood to mean, for example, inorganic and organic pigments, pigment blacks, effect pigments, for example pearlescent pigments and/or metal effect pigments, sparkle pigments and mixtures thereof.

Examples of pigments are monoazo, diazo, triazo and polyazo pigments, oxazine pigments, dioxazine pigments, thiazine pigments, diketopyrrolopyrroles, phthalocyanines, ultramarine and other metal complex pigments, indigoid pigments, diphenylmethane, triarylmethane, xanthene, acridine, quinacridone and methine pigments, anthraquinone, pyranthrone and perylene pigments and other polycyclic carbonyl pigments. Further examples of organic pigments may be found in the monograph: W. Herbst, K. Hunger "Industrial Organic Pigments", 1997 (publisher: Wiley-VCH, ISBN: 3-527-28836-8). Examples of inorganic pigments are pigments based on carbon black, graphite, zinc, titanium dioxide, zinc oxide, zinc sulfide, zinc phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example nickel titanium yellow, bismuth vanadate molybdate yellow or chromium titanium yellow). Further examples are given in the monograph: G. Buxbaum "Industrial Inorganic Pigments", 1998 (publisher: Wiley-VCH, ISBN: 3-527-28878-3). Inorganic pigments may also be magnetic pigments based on pure iron, iron oxides and chromium oxides or mixed oxides, metal effect pigments comprising aluminum, zinc, copper or brass and also pearlescent pigments, fluorescent and phosphorescent luminous pigments. Further examples are nanosize organic or inorganic solids having particle sizes below 100 nm, such as certain types of carbon black or particles consisting of a metal or semimetal oxide or hydroxide, and also particles consisting of mixed metal and/or semimetal oxides or hydroxides. For example, the oxides and/or oxide hydroxides of aluminum, silicon, zinc, titanium, etc., can be used to produce such extremely finely divided solids. These oxide or hydroxide or oxide-hydroxide particles can be produced by a wide variety of different processes, for example ion-exchange processes, plasma processes, sol-gel processes, precipitation, comminution (for example by milling) or flame hydrolysis, etc. These nanoscale solids may also be what are called hybrid particles, which consist of an inorganic core and an organic shell, or vice versa.

Examples of pulverulent or fibrous fillers are, for example, those which are made up of pulverulent or fibrous particles of aluminum oxide, aluminum hydroxide, silicon dioxide, kieselguhr, diatomaceous earth, quartz, silica gel, talc, kaolin, mica, perlite, feldspar, ground shale, calcium sulfate, barium sulfate, calcium carbonate, calcite, dolomite, glass or carbon. Further examples of pigments or fillers can be found, for example, in EP-A-0 270 126. It is also possible to achieve excellent dispersion and stabilization of flame retardants, for example aluminum hydroxide or magnesium hydroxide, and matting agents, for example silicas.

With regard to pearlescent pigments, use may be made, for example, of the types or kinds of pearlescent pigments that are listed below:
  natural pearlescent pigments, such as pearl essence (mixed guanine/hypoxanthine crystals from fish flakes) and mother-of-pearl (ground mussel shells),
  monocrystalline pearlescent pigments, such as bismuth oxychloride (BiOCl) or platelet-shaped titanium dioxide, and
  layer-substrate pearlescent pigments.

Suitable platelet-shaped transparent substrates for coating for the layer-substrate pearlescent pigments are nonmetallic, natural, or synthetic platelet-shaped substrates. The substrates are preferably substantially transparent, more preferably transparent, i.e., at least partly transmissive for visible light.

These platelet-shaped transparent substrates may be selected from the group of natural mica, synthetic mica, glass flakes, $SiO_2$ platelets, $Al_2O_3$ platelets, sericite, kaolin, graphite, talc, polymer platelets, platelet-shaped bismuth oxychloride, platelet-shaped substrates which comprise a hybrid organic-inorganic layer, and mixtures thereof.

Synthetic substrates, such as glass flakes or synthetic mica, for example, have smooth surfaces and also a uniform thickness within an individual substrate particle. The surface therefore presents only few scattering centers for incident and/or reflected light, and hence, after coating, allows pearlescent pigments which have a greater luster than with natural mica as the substrate. Glass flakes used are preferably those which can be produced by the processes described in EP 0 289 240 A1, WO 2004/056716 A1, and WO 2005/063637 A1 and/or which have the glass composition known from EP 1 980 594 B1.

The pearlescent pigments may also have platelet-shaped transparent substrates, examples being glass flakes, which have been coated in particular on both sides with semitransparent metal layers. The metals of the semitransparent metal layers are preferably selected from the group of silver, aluminum, chromium, nickel, gold, platinum, palladium, copper, zinc, titanium, and also the mixtures and alloys thereof.

The platelet-shaped transparent substrate may be provided with at least one optically active layer or coating, the layers preferably comprising metal oxides, metal oxide hydrates, metal hydroxides, metal suboxides, metals, metal fluorides, metal oxyhalides, metal chalcogenides, metal nitrides, metal oxynitrides, metal sulfides, metal carbides, and mixtures thereof. In accordance with one preferred embodiment of the present invention, the optically active layers or coatings consist of the aforementioned materials.

If a layer or coating of high refractive index is applied to the platelet-shaped transparent substrate, the refractive index is situated more particularly at $n \geq 1.8$, preferably at $n \geq 1.9$, and more preferably at $n \geq 2.0$. In the case of a coating or layer of low refractive index, the refractive index is situated in particular at $n < 1.8$, preferably at $n < 1.7$, and more preferably at $n < 1.6$.

Examples of a suitable high-index layer or coating include $TiO_2$, $Fe_2O_3$, $Fe_3O_4$, $TiFe_2O_5$, $FeTiO_3$, $ZnO$, $SnO_2$, $CoO$, $Co_3O_4$, $ZrO_2$, $Cr_2O_3$, $VO_2$, $V_2O_3$, $Sb_2O_3$, $SnO_2$, $SbO_2$, and mixtures thereof. Preference is given to using $TiO_2$ and/or $Fe_2O_3$. Examples of a suitable low-index layer or coating include $SiO_2$, $Al_2O_3$, $MgF_2$, and mixtures thereof.

The platelet-shaped transparent substrates of the pearlescent pigments may be coated with a single-ply or multi-ply layer construction composed of metal oxides, metal hydroxides, metal suboxides, and/or metal oxide hydrates, and the sequence of the layers may be variable. The metal oxides, metal hydroxides, metal suboxides and/or metal oxide hydrates may also be present alongside one another in the same layer.

Where the platelet-shaped transparent substrate is coated with only one single metal oxide layer, that layer preferably has a high refractive index. Depending on the geometric thickness of the metal oxide layer, pearlescent pigments of these kinds may produce different color effects. For example, silver-white pearlescent pigments with a $TiO_2$ covering and a geometric $TiO_2$ layer thickness of 40 to 60 nm have the color silver; interference pigments with a $TiO_2$ covering and a geometric $TiO_2$ layer thickness of 60 to 80 nm have the color yellow; of 80 to 100 nm, the color red; of 100 to 140 nm, the color blue; of 120 to 160 nm, the color green; and of 280 to 320 nm, the color green (IIIrd order); color gloss pigments with an $Fe_2O_3$ covering and a geometric $Fe_2O_3$ layer thickness of 35 to 45 nm have the color bronze; of 45 to 55 nm, the color copper; of 55 to 65 nm, the color red; of 65 to 75 nm, the color red-violet; of 75 to 85 nm, the color red-green; and, with an $Fe_3O_4$ covering, the color black; combination pigments have gold tones with a TiO$_2$/Fe$_2$O$_3$ covering, the color green with a TiO$_2$/Cr$_2$O$_3$ covering, and the color deep blue with a TiO$_2$/Prussian blue covering.

The platelet-shaped transparent substrates may also be coated with a multi-ply layer construction comprising or consisting of metal oxide, metal hydroxide, metal suboxide and/or metal oxide hydrate, and the sequence of the layers may be variable. Preference here is given to a layer sequence in which at least one high-index layer and at least one low-index layer are arranged in alternation on a substrate. With the alternating arrangement it is also possible for one or more high-index layers to be arranged immediately above one another, and subsequently for one or more low-index layers to be arranged immediately one above another. It is essential, though, that layers of high and low index occur within the layer construction. Preferably, starting from the substrate, there are at least one high-index layer, low-index layer, and high-index layer arranged again, resulting in pearlescent pigments having particularly intense interference colors.

Pearlescent pigments coated with TiO$_2$ and/or iron oxide and based on platelet-shaped natural mica are available commercially, for example, under the name Prestige from Eckart GmbH. Where the platelet-shaped transparent substrate is composed of synthetic mica, pearlescent pigments of this kind are available commercially, for example, under the trade name SynCrystal from Eckart GmbH. TiO$_2$— and/or Fe$_2$O$_3$-coated Al$_2$O$_3$ flakes and correspondingly coated SiO$_2$ flakes are available for example under the trade name Xirona from Merck KGaA. TiO$_2$— and/or iron oxide-coated glass flakes are available for example from Eckart under the name Mirage, from BASF Catalysts under the name Reflecks, or from Merck KGaA under the name Ronstar. Multilayer interference pigments as well, of the kind described in DE 196 18 569 A1, for example, and consisting of a support material coated with alternating layers of metal oxides of low and high refractive index, may be used for the purposes of the present invention.

Additionally possible for use are pigments featuring interference effects but having no substrate, examples being liquid crystals, such as Helicones, obtainable from LCP Technology GmbH, or particles with opalescent effect, consisting of monodisperse beads in a three-dimensional structure featuring close packing in domains and a regular arrangement, of the kind that are described in WO 2001/88044, for example. Furthermore, it is also possible for holographic sparkle pigments, such as geometry pigments from Spectratek, for example, fluorescent pigments, phosphorescent pigments, photochromic pigments, thermochromic pigments, and what are called "Quantum Dots", available for example from Quantum Dots Corporation, to be used.

Also possible for use, furthermore, are effect pigments known as sparkle pigments, which are available from Floratech for example under the trade name Metasomes Standard/Glitter in a variety of colors (yellow, red, green, blue). The glitter particles in this case may be present in mixtures with various auxiliaries and dyes (for example the dyes having the Color Index (CI) numbers 19 140, 77 007, 77 289, and 77 491).

Besides pearlescent pigments, metallic effect pigments in particular, as well, may be employed in the context of the present invention.

The platelet-shaped metal substrate in that case may consist in particular of a pure metal and/or of a metal alloy. The metal substrate may be selected preferably from the group of silver, aluminum, iron, chromium, nickel, molybdenum, gold, copper, zinc, tin, stainless steel, magnesium, steel, bronze, brass, titanium, and the alloys and/or mixtures thereof. Preferably, however, the metal substrate is composed of aluminum (aluminum content preferably >99% by weight, based on the metal substrate), copper (copper content preferably >99% by weight, based on the metal substrate), and gold bronze (copper content for example 70 to 95% by weight, zinc content for example 5 to 30% by weight, based in each case on the metal substrate). The impurities present in the metallic substrates ought to be present in extremely small amounts, preferably <1% by weight, based on the substrate.

The platelet-shaped metal substrate may have been given at least one aftercoat. This aftercoat may consist for example of metal oxides, metal hydroxides, or metal oxide hydrates, for example titanium dioxide, aluminum oxide, iron oxide, cerium oxide, chromium oxide, and silicon oxide, or mixtures thereof. The aftercoat preferably consists of at least one layer of silicon dioxide.

Metallic effect pigments stabilized in this way, as described in EP 1 532 213 B1 and also in EP 1 758 550 A2, are available for example under the brand name Visionaire from Eckart GmbH.

An extended color palette for metallic effects is additionally offered, furthermore, by colored metallic effect pigments having
a) a core of aluminum and also a coloring layer obtained by wet-chemical oxidation and composed of aluminum oxide and/or aluminum hydroxide and/or aluminum oxide hydrate, or
b) a core and also at least one metal oxide layer which comprises at least one color pigment.

Additionally colored metallic effect pigments, as well as the traditional gold and silver shades, also permit red shades, such as Visionaire Bright Red 7 and Visionaire Bright Red 34, for example; blue shades, such as Visionaire Bright Blue, for example; and also warm champagne shades, such as Visionaire Bright Champagne, for example. Such pigments are known for example from DE 195 01 307 A1, DE 195 20 312 A1, DE 103 61 436 A1, and DE 10 2006 006 716 A1, and are available commercially from Eckart GmbH.

It is also possible, moreover, to use metallic effect pigments that reflect infrared radiation and are described in WO 2007/076967, for example, possessing a core which reflects infrared radiation. The IR radiation-reflecting core is provided with an enveloping coating which is transmissive for infrared rays. The infrared radiation-reflecting pigment is substantially white.

Besides these it is possible to use magnetic metallic effect pigments, for example platelet-shaped iron pigments which may have been stabilized using a passivating inhibitor layer or corrosion control layer. Pigments of these kinds are described in EP 1 251 152 B1, for example.

The pigments may be selected for example from the corresponding positive list of the Cosmetics Regulation (Regulation (EC) No. 1223/2009, Annex IV).

In a further embodiment, the pigments described may have been coated with at least one organic aftercoat, applied in a manner familiar to the skilled person.

Preferred aftercoating techniques include for example:
PEG-silicone coating, such as the "AQ" modification, available from LCW;
chitosan coating, such as the "CTS" modification, available from LCW;
triethoxycaprylylsilane coating, such as the "AS" modification, available from LCW;
methicone coating, such as the "SI" modification, available from LCW;
dimethicone coating, such as the "Covasil 3.05" modification, available from LCW;

dimethicone/trimethylsiloxysilicate coating, such as the "Covasil 4.05" modification, available from LCW;
lauryllysine coating, such as the "LL" modification, available from LCW;
lauryllysine-methicone coating, such as the "LL/SI" modification, available from LCW;
magnesium myristate treatment, such as the "MM" modification, available from LCW;
aluminum dimyristate coating, such as the "Ml" modification, available from Miyoshi;
perfluoropolymethyl isopropyl ether coating, such as the "FHC" modification, available from LCW;
disodium stearylglutamate coating, such as the "NAI" modification, available from Miyoshi;
perfluoroalkyl phosphate treatment, such as the "PF" modification, available from Daito;
acrylate/dimethicone and perfluoroalkyl phosphate coating, such as the "FSA" modification, available from Daito;
polymethylhydrogensiloxane/perfluoroalkyl phosphate coating, such as the "FS01" modification, available from Daito;
lauryllysine/aluminum tristearate coating, such as the "LL-StAl" modification, available from Daito;
octyltriethylsilane coating, such as the "OTS" modification, available from Daito;
octyltriethylsilane/perfluoroalkyl phosphate coating, such as the "FOTS" modification, available from Daito;
acrylate-dimethicone copolymer coating, such as the "ASC" modification, available from Daito;
isopropyltitanium triisostearate coating, such as the "ITT" modification, available from Daito;
microcrystalline cellulose and carboxymethyl cellulose coating, such as the "AC" modification, available from Daito;
acrylate copolymer coating, such as the "APD" modification, available from Daito; and also
perfluoroalkyl phosphate/isopropyltitanium triisostearate coating, such as the "PF+ITT" modification, available from Daito, for example.

The pigments may be present not only individually but also in a mixture and, furthermore, may have been mutually coated with one another.

In order to achieve specific color effects, it is possible in the context of the present invention, as well as the pigments described, to use further pigments and/or effect pigments and/or mixtures thereof, in variable proportions.

Silicone Oils

Examples of silicone oils include those of the following structures:

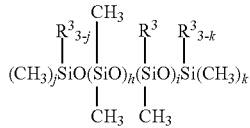

(III)

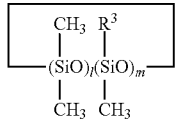

(IV)

(V)

where $R^3$ is selected from the group consisting of hydrogen, a hydroxyl group, alkyl or fluorinated alkyl groups having 2 to 20 carbon atoms, aryl groups, aminoalkyl groups, $C_{6-22}$ alkoxy groups, and a group of the formula $(CH_3)_3SiO[(CH_3)_2SiO]_ySi(CH_3)_2)CH_2CH_2$—, in which y is an integer from 0 to 500. $R^4$ is a $C_{1-20}$ alkyl group. In formula (III), h is an integer from 0 to 1000, is an integer from 0 to 1000, with the proviso that h+i is 1 to 2000, and each j and k independently of one another is 0, 1, 2, or 3. In formula (IV) l and m are integers from 0 to 8, with l+m ranging from 3 to 8, and in formula (V), z is an integer from 1 to 4. Examples of the $R^3$ radical include methyl, ethyl, propyl, butyl, hexyl, octyl, decyl, dodecyl, tetradecyl, hexadecyl, octadecyl, trifluoropropyl, nonafluorohexyl, heptadecylfluorodecyl, phenyl, aminopropyl, dimethylaminopropyl, aminoethylaminopropyl, stearoxy, butoxy, ethoxy, propoxy, cetyloxy, myristyloxy, styryl, and alpha-methylstyryl, among which preference is given to hexyl, octyl, decyl, dodecyl, tetradecyl, hexadecyl, octadecyl, trifluoropropyl, phenyl, aminopropyl, and aminoethylaminopropyl. Examples of the silicone oil include organopolysiloxanes with low or high viscosity, such as dimethylpolysiloxane, methylphenylpolysiloxane, methylhydrogenpolysiloxane, and dimethylsiloxane-methylphenylsiloxane copolymer, for example; cyclosiloxanes, such as octamethylcyclotetrasiloxane (D4), decamethylcyclopentasiloxane (D5), dodecamethylcyclohexasiloxane (D6), tetramethyltetrahydrogencyclotetrasiloxane (H4), and tetramethyltetraphenylcyclotetrasiloxane; tristrimethylsiloxysilane (M3T), tetrakistrimethylsiloxysilane (M4Q); branched siloxanes, such as tristrimethylsiloxypropylsilane, tristrimethylsiloxybutylsilane, tristrimethylsiloxyhexylsilane, and tristrimethylsiloxyphenylsilane, for example; higher alcohol-modified silicones, such as steroxysilicone; alkyl-modified silicones, amino-modified silicones, and fluoro-modified silicones.

Applications

The dispersions of pigment and/or filler in silicone oil in accordance with the present invention can be used in a wide range of formulations, including resins, oils, greases, lubricants, rubber materials, sealants, adhesives, waxes, or coating materials. The dispersions may also be used in formulations which are produced in the body care industry, or in electrical applications in the electronics industry, in the marine industry, for medical applications, in the construction industry, or in the automotive industry. Examples include cosmetic products, electronic paper, such as the display in e-books, the encapsulation of microelectronic chips, submarine skin coatings, for example antifouling coatings, silicone tubes, or lubricity additives for brake components.

The copolymers may be used in relatively wide amounts of 0.01 to 90% by weight, preferably 1 to 50% by weight, very preferably 2 to 40% by weight, in each case based on the overall composition of the homogeneous dispersion. The homogeneous dispersions are preferably pigment and filler preparations.

Additionally provided with the present invention are paints, pastes and molding compounds comprising the copolymers of the invention and one or more pigments, organic solvents and/or water, and also, optionally, binders and customary coatings auxiliaries.

Additionally provided by the invention are coating materials, plastics, or homogeneous dispersions comprising at least one copolymer of the invention. In this case the copolymer fraction is preferably 0.01 to 5% by weight, more preferably 0.02 to 2% by weight, and very preferably 0.03 to 1% by weight, based in each case on the overall composition of the coating material or of the plastic, in coating materials or plastics, or, in homogeneous dispersions, such as pigment and filler preparations, preferably 0.01 to 90% by weight, more preferably 1 to 50% by weight, very preferably 2 to 40% by weight, based in each case on the overall composition of the homogeneous dispersion.

EXAMPLES

Abbreviations

"MAA"=methacrylic acid
"HEMA"=2-hydroxyethyl methacrylate
"EHA"=2-ethylhexyl acrylate
"IBMA"=isobutyl methacrylate
"STY"=styrene
"PMA"=1-methoxy-2-propyl acetate
"TDI"=tolyl diisocyanate
"TDI100"=tolylene 2,4-diisocyanate
"DBTL"=dibutyltin dilaurate
"PDI"=polydispersity index
"PDMS"=polydimethylsiloxane
"TDI-PDMS"=monoadducts of monohydroxy-functional polydimethylsiloxane and tolyl diisocyanate
"HEMA-TDI-PDMS"=adduct of 2-hydroxyethyl methacrylate and a monoadduct of a monohydroxy-functional polydimethylsiloxane and tolyl diisocyanate
"PEG"=polyethylene glycol
"TDI-PEG-PDMS"=monoadduct of monohydroxy-functional polyethylene glycol, polydimethylsiloxane and tolyl diisocyanate
"HEMA-TDI-PEG-PDMS"=adduct of 2-hydroxyethyl methacrylate and a monoadduct of a monohydroxy-functional polyethylene glycol, polydimethylsiloxane and tolyl diisocyanate
"Silicone oil D5" is a cyclopolydimethylsiloxane (decamethylcyclopentasiloxane).

Trade Names:
"Silaplane FM-0421" is a linear monohydroxy-functional polydimethylsiloxane (Mw~5000) available from Chisso Corp.
"Silaplane FM-0721" is a monomethacryloyl-functional polydimethylsiloxane (Mw~5000) available from Chisso Corp.
"Trigonox C" is a tert-butyl perbenzoate. It is an initiator of free-radical polymerization (available from Akzo Nobel Chemicals).
"Dow Corning 5562" (DC5562) is a polyether-modified polysiloxane suitable for combination with pigments in decorative cosmetics, improves dispersibility (available from Dow Corning).

Test Methods:
Gel Permeation Chromatography (GPC)
Gel permeation chromatography was conducted at 40° C. with a high-pressure liquid chromatography pump (Bischoff HPLC 2200) and a refractive index detector (Waters 419). The eluent used was tetrahydrofuran at an elution rate of 1 ml/min. Calibration was conducted by means of polystyrene standards. The number-average molecular weight Mn, the weight-average molecular weight Mw and the polydispersity index PDI=Mw/Mn were calculated with the program NTeqGPC.

NCO Content Determination
The NCO content is determined quantitatively by reaction of the NCO groups (isocyanates) with an excess of dibutylamine to give urea derivatives, followed by back-titration of the excess amine with HCL. The NCO content indicates the content of isocyanate in % by weight.

Hydroxyl Number Determination
Alcoholic hydroxyl groups are converted by acetylation with an excess of acetic anhydride. Subsequently, the excess acetic anhydride is eliminated by addition of water to give acetic acid and back-titrated with ethanolic KOH. The OH number indicates the amount of KOH in mg which is equivalent to the amount of acetic acid bound in the acetylation of 1 g of substance.

Solids Determination
About 2 g of sample are weighed into a previously dried aluminum dish and dried in a drying cabinet at 150° C. for 10 minutes, cooled in a desiccator, and then reweighed. The residue corresponds to the solids content.

Examples

Examples with Polydimethylsiloxane-Containing Copolymers

Preparation of a TDI-PDMS Monoadduct (1a):
A four-neck flask provided with stirrer, thermometer, dropping funnel, reflux condenser and nitrogen inlet tube is initially charged with 33.4 g of Desmodur T100 (TDI100, NCO content=48.8% by weight) and 0.57 g of benzoyl chloride, which are mixed thoroughly. 250 g of Silaplane FM-0421 are metered in gradually, such that the temperature does not exceed 55° C. After the metered addition, the mixture is stirred at 55° C. for a further 3 hours. The excess TDI is removed from the reaction mixture by means of a thin-film evaporator at 150° C. The NCO content is 0.92% by weight and the residual TDI content is 0.21% by weight.

Preparation of an HEMA-TDI-PDMS Macromonomer (1b):
A four-neck flask provided with stirrer, thermometer, dropping funnel, reflux condenser and nitrogen inlet tube is initially charged with 70 g of TDI-PDMS monoadduct (1a), 4 g of HEMA, 0.015 g of DBTL and 0.004 g of phenothiazine, which are mixed thoroughly. The mixture is heated to 80° C. and stirred for 5 hours until the NCO content is <0.05% by weight.

Preparation of a TDI-PEG-PDMS Monoadduct (2a):
Synthesis of monohydroxy-functional polyethylene glycol polydimethylsiloxane (intermediate 2a): A four-neck flask provided with stirrer, thermometer, dropping funnel, reflux condenser and nitrogen inlet tube is initially charged with allyl polyethylene glycol (477.8 g, Mn≈387 g/mol) and Karstedt catalyst (2.44 g, 0.2% initial solution in xylene), which are heated to 55° C. A mono-SiH-functional polydimethylsiloxane (500 g, Mn≈505 g/mol) is metered in in such a way that the temperature does not exceed 75° C. The conversion of the mono-SiH-functional polysiloxane is monitored by means of gas-volumetric determination. The measured hydroxyl number of the product is 71.9 mg KOH/g.

A four-neck flask provided with stirrer, thermometer, dropping funnel, reflux condenser and nitrogen inlet tube is initially charged with 357.8 g of Desmodur T100 (TDI100, NCO content=48.8% by weight) and 0.15 g of benzoyl chloride, which are mixed thoroughly. 400 g of a monohydroxy-functional polysiloxane (intermediate 2a) are metered in gradually, in such a way that the temperature does not exceed 35° C. After the metered addition, the mixture is stirred at 35° C. for a further 6 hours. The excess TDI is removed from the reaction mixture by means of a thin-film evaporator at 150° C. The NCO content is 4.65% by weight and the residual TDI content is 0.13% by weight.

Preparation of an HEMA-TDI-PEG-PDMS Macromonomer (2b):

A four-neck flask provided with stirrer, thermometer, dropping funnel, reflux condenser and nitrogen inlet tube is initially charged with 250 g of TDI-PEG-PDMS monoadduct (2a), 39.51 g of HEMA, 0.43 g of DBTL and 0.02 g of phenothiazine, which are mixed thoroughly. The mixture is heated to 80° C. and stirred for 5 hours until the NCO content is <0.05% by weight.

Preparation of an IPDI-PDMS Monoadduct (3a):

Synthesis of monohydroxy-functional polydimethylsiloxane (intermediate 3a): a four-neck flask provided with stirrer, thermometer, dropping funnel, reflux condenser and nitrogen inlet tube is initially charged with mono-SiH-functional polysiloxane (300 g, Mn≈2000 g/mol) and Karstedt catalyst (0.75 g, 0.2% initial solution in xylene), which are heated to 55° C. Allyl glycol (19.9 g) is metered in in such a way that the temperature does not exceed 75° C. The conversion of the mono-SiH-functional polysiloxane is monitored by means of gas-volumetric determination. On completion of conversion, the excess allyl glycol is distilled off. The measured hydroxyl number of the product is 25.2 KOH/g.

A four-neck flask provided with stirrer, thermometer, dropping funnel, reflux condenser and nitrogen inlet tube is initially charged with 33.4 g of IPDI (NCO content=37.4% by weight), 46 g of xylene and 0.08 g of DBTL, which are mixed thoroughly. 300 g of a monohydroxy-functional polysiloxane (intermediate 3a) are metered in gradually, in such a way that the temperature does not exceed 30° C. After the metered addition, the mixture is stirred for a further 2 hours. The excess IPDI is removed from the reaction mixture by means of a thin-film evaporator at 150° C. The NCO content is 1.68% by weight and the residual IPDI content is 0.01% by weight.

Preparation of an HEMA-IPDI-PDMS Macromonomer (3b):

A four-neck flask provided with stirrer, thermometer, dropping funnel, reflux condenser and nitrogen inlet tube is initially charged with 189.16 g of IPDI-PDMS monoadduct (3a), 10.84 g of HEMA, 0.3 g of DBTL, 0.05 g of 2,6-di-tert-butyl-p-cresol and 0.1 g of hydroquinone monomethyl ether, which are mixed thoroughly. The mixture is heated to 70° C. and stirred for 9 hours until the NCO content is <0.05% by weight.

Preparation of a PDMS Macromonomer without Urethane Bonds (4):

A four-neck flask provided with stirrer, thermometer, dropping funnel, reflux condenser and nitrogen inlet tube is initially charged with 125 g of allyl methacrylate, 100 g of toluene and 0.6 g of Karstedt solution (0.8% in xylene), which are mixed thoroughly. At 25° C., 250 g of mono-SiH-functional polysiloxane (Mn≈2000 g/mol) are metered in within 6 hours. The conversion of the mono-SiH-functional polysiloxane is monitored by means of gas-volumetric determination. After complete conversion of SiH function, 0.125 g of hydroquinone is added and the mixture is distilled at 100° C. for 3 hours.

Inventive Example 1

Macromonomer Method

A four-neck flask provided with stirrer, thermometer, dropping funnel, reflux condenser and nitrogen inlet tube is initially charged with 6.10 g of the HEMA-TDI-PDMS macromonomer (1b) and 100 g of PMA, which are mixed thoroughly. Nitrogen is passed over for the entire reaction. The temperature is increased to 135° C., and a mixture of 1.21 g of MAA, 25.3 g of IBMA, 15.4 g of HEMA, 17.4 g of STY and 0.89 g of Trigonox C is metered in within 3 hours. After metered addition has ended, 0.15 g of Trigonox C is added immediately. After a further 30 minutes and 60 minutes, another 0.15 g each time of Trigonox C is added. Thereafter, the mixture is kept at 135° C. for another hour. 104 g of PMA are added. The OH number of the polymer solution is 30.8 mg KOH/g and a solids content of 28.3% was determined. The GPC chromatogram shows a monomodal distribution of the polydimethylsiloxane-containing copolymer with $M_w$=18 100 g/mol and PDI=4.97.

Inventive Example 2

"Grafting to" Method

A four-neck flask provided with stirrer, thermometer, dropping funnel, reflux condenser and nitrogen inlet tube is initially charged with 100 g of PMA and heated to 135° C. Within 3 hours, a mixture of 1.21 g of MAA, 25.3 g of IBMA, 15.4 g of HEMA, 17.4 g of STY and 0.89 g of Trigonox C is metered in. After metered addition has ended, 0.15 g of Trigonox C is added immediately. After a further 30 minutes and 60 minutes, another 0.15 g each time of Trigonox C is added. Thereafter, the mixture is kept at 135° C. for another hour. 104 g of PMA are added. The temperature is lowered to 80° C., 0.035 g of DBTL and 6.06 g of TDI-PDMS monoadduct (1a) are added, and the mixture is stirred at 80° C. for 5 hours. The OH number of the polymer solution is 24 mg KOH/g and a solids content of 26.8% was determined. The GPC chromatogram shows a monomodal distribution of the polydimethylsiloxane-containing copolymer with $M_w$=15 800 g/mol and PDI=4.66.

Comparative Example 3

A four-neck flask provided with stirrer, thermometer, dropping funnel, reflux condenser and nitrogen inlet tube is initially charged with 6.10 g of Silaplane FM-0721 and 100 g of PMA, which are mixed thoroughly. Nitrogen is passed over for the entire reaction. The temperature is increased to 135° C., and a mixture of 1.21 g of MAA, 25.3 g of IBMA, 15.4 g of HEMA, 17.4 g of STY and 0.89 g of Trigonox C is metered in within 3 hours. After metered addition has ended, 0.15 g of Trigonox C is added immediately. After a further 30 minutes and 60 minutes, another 0.15 g of Trigonox C is added each time. Thereafter, the mixture is kept at 135° C. for another hour. 104 g of PMA are added. The OH number of the polymer solution is 26.8 mg KOH/g and a solids content of 26.3% was determined. The GPC chromatogram shows a monomodal distribution of the polydimethylsiloxane-containing copolymer with $M_w$=14 500 g/mol and PDI=3.87.

Comparative Example 4

A four-neck flask provided with stirrer, thermometer, dropping funnel, reflux condenser and nitrogen inlet tube is initially charged with 100 g of PMA. Nitrogen is passed over for the entire reaction. The temperature is increased to 135° C., and a mixture of 1.21 g of MAA, 25.3 g of IBMA, 15.4 g of HEMA, 17.4 g of STY and 0.89 g of Trigonox C is metered in within 3 hours. After metered addition has ended, 0.15 g of Trigonox C is added immediately. After a further 30 minutes and 60 minutes, another 0.15 g of Trigonox C is added each time. Thereafter, the mixture is kept at 135° C. for another hour. 104 g of PMA are added. The OH number of the polymer solution is 29.5 mg KOH/g and a solids content of 22.8% was determined. The GPC chromatogram shows a monomodal distribution of the copolymer with $M_w$=13 600 g/mol and PDI=3.48.

Inventive Example 5

Macromonomer Method

A four-neck flask provided with stirrer, thermometer, dropping funnel, reflux condenser and nitrogen inlet tube is initially charged with 54 g of the HEMA-IPDI-PDMS macromonomer (3b) and 38.2 g of PMA, which are mixed thoroughly. Nitrogen is passed over for the entire reaction. The temperature is increased to 110° C. and a mixture of 6 g of EHA and 1.8 g of Trigonox C is metered in within 3 hours. After metered addition has ended, 0.3 g of Trigonox C is added immediately. After a further 30 minutes and 60 minutes, another 0.3 g each time of Trigonox C is added. Thereafter, the mixture is kept at 115° C. for another 2 hours. All solvent is distilled off. The GPC chromatogram shows a monomodal distribution of the copolymer with $M_w$=31 927 g/mol and PDI=2.73.

Inventive Example 6

Macromonomer Method

A four-neck flask provided with stirrer, thermometer, dropping funnel, reflux condenser and nitrogen inlet tube is initially charged with 57 g of the HEMA-IPDI-PDMS macromonomer (3b) and 38.2 g of PMA, which are mixed thoroughly. Nitrogen is passed over for the entire reaction. The temperature is increased to 110° C. and a mixture of 3 g of EHA and 1.8 g of Trigonox C is metered in within 3 hours. After metered addition has ended, 0.3 g of Trigonox C is added immediately. After a further 30 minutes and 60 minutes, another 0.3 g each time of Trigonox C is added. Thereafter, the mixture is kept at 115° C. for another 2 hours. All solvent is distilled off. The GPC chromatogram shows a monomodal distribution of the copolymer with $M_w$=90 038 g/mol and PDI=5.87.

Inventive Example 7

Macromonomer Method

A four-neck flask provided with stirrer, thermometer, dropping funnel, reflux condenser and nitrogen inlet tube is initially charged with 48 g of the HEMA-IPDI-PDMS macromonomer (3b) and 38.2 g of PMA, which are mixed thoroughly. Nitrogen is passed over for the entire reaction. The temperature is increased to 110° C. and a mixture of 12 g of EHA and 1.8 g of Trigonox C is metered in within 3 hours. After metered addition has ended, 0.3 g of Trigonox C is added immediately. After a further 30 minutes and 60 minutes, another 0.3 g each time of Trigonox C is added. Thereafter, the mixture is kept at 115° C. for another 2 hours. All solvent is distilled off. The GPC chromatogram shows a distribution of the copolymer with $M_w$=29 887 g/mol and PDI=3.2.

Comparative Example 8

A four-neck flask provided with stirrer, thermometer, dropping funnel, reflux condenser and nitrogen inlet tube is initially charged with 57 g of the PDMS macromonomer without urethane bonds (4) and 38.2 g of PMA, which are mixed thoroughly. Nitrogen is passed over for the entire reaction. The temperature is increased to 110° C. and a mixture of 3 g of EHA and 1.8 g of Trigonox C is metered in within 3 hours. After metered addition has ended, 0.3 g of Trigonox C is added immediately. After a further 30 minutes and 60 minutes, another 0.3 g each time of Trigonox C is added. Thereafter, the mixture is kept at 115° C. for another 2 hours. All solvent is distilled off. The GPC chromatogram shows a distribution of the copolymer with $M_w$=32 777 g/mol and PDI=4.74.

Inventive Example 9

Macromonomer Method

A four-neck flask provided with stirrer, thermometer, dropping funnel, reflux condenser and nitrogen inlet tube is initially charged with 8.2 g of the HEMA-TDI-PEG-PDMS macromonomer (2b) and 102 g of PMA, which are mixed thoroughly. Nitrogen is passed over for the entire reaction. The temperature is increased to 135° C. and a mixture of 1.24 g of MAA, 25.86 g of IBMA, 13.78 g of HEMA, 17.78 g of STY and 0.92 g of Trigonox C is metered in within 3 hours. After metered addition has ended, 0.15 g of Trigonox C is added immediately. After a further 30 minutes and 60 minutes, another 0.15 g each time of Trigonox C is added. Thereafter, the mixture is kept at 135° C. for another hour. The OH number of the polymer solution is 35.6 mg KOH/g and a solids content of 45.8% was determined. The GPC chromatogram shows a monomodal distribution of the polydimethylsiloxane-containing copolymer with $M_w$=25 939 g/mol and PDI=5.68.

Inventive Example 10

"Grafting to" Method

A four-neck flask provided with stirrer, thermometer, dropping funnel, reflux condenser and nitrogen inlet tube is initially charged with 102 g of PMA and heated to 135° C. Within 3 hours, a mixture of 1.24 g of MAA, 25.85 g of IBMA, 15.74 g of HEMA, 17.78 g of STY and 0.92 g of Trigonox C is metered in. After metered addition has ended, 0.15 g of Trigonox C is added immediately. After a further 30 minutes and 60 minutes, another 0.15 g each time of Trigonox C is added. Thereafter, the mixture is kept at 135° C. for another hour. 104 g of PMA are added. The temperature is lowered to 80° C., 0.035 g of DBTL and 6.19 g of TDI-PEG-PDMS monoadduct (2a) are added, and the mixture is stirred at 80° C. for 5 hours. The OH number of the polymer solution is 33.9 mg KOH/g and a solids content of 45.7% was determined. The GPC chromatogram shows a monomodal distribution of the polydimethylsiloxane-containing copolymer with $M_w$=17 353 g/mol and PDI=4.14.

Use Examples with Polydimethylsiloxane-Containing Copolymers as Surface Additives Test system: acrylate-melamine baking varnish, clear Composition (figures in parts by weight)

| | |
|---|---|
| Setalux 1756 VV-65 (acrylate baking resin, Nuplex Resins) | 60 |
| Setamine US 138 BB-70 (amino baking resin, Nuplex Resins) | 24 |
| Shellsol A | 8 |
| xylene | 8 |
| Additive | 1 |

The additives used are the products according to inventive examples 1 and 2 and according to comparative examples 3 and 4, and the commercial product MODAFLOW (leveling agent from Cytec Industries; solids content 100%), the starting weight being based in each case on the solids content. The 5 components are first stirred in by hand and then mixed with a Scandex shaker for 10 minutes.

a) Test as Leveling Agent

The substances from examples 1, 2, 3, 4 and MODAFLOW (leveling agent from Cytec Industries; solids content 100%) are incorporated into the acrylate-melamine baking varnish as described above. One day after shaking, the additized varnishes and the unadditized varnish are drawn down onto a primed aluminum sheet with a 100 µm spiral coating bar. After a ventilation time of 10 minutes, the sheets are baked at 140° C. for 25 minutes.

The profile was determined with the Wave-scan DOI from Byk-Gardner, by measuring the long wave, short wave and the DOI (distinctness of image) value. Gloss and haze were determined with the Haze-Gloss from Gardner.

|  | Long wave | Short wave | DOI | R20 gloss | Haze |
|---|---|---|---|---|---|
| No additive | 25 | 59 | 85 | 90 | 27 |
| MODAFLOW | 4 | 17 | 92 | 94 | 14 |
| Comparative example 4 | 14 | 43 | 89 | 82 | 20 |
| Comparative example 3 | 2.6 | 18 | 92 | 95 | 13 |
| Inventive example 1 | 2.0 | 15 | 92 | 95 | 12 |
| Inventive example 2 | 2.2 | 16 | 92 | 95 | 12 |

The results show that, in the case of use of copolymers from examples 1 and 2 as leveling agents, better results are achieved with regard to profile, gloss and haze than in the case of use of a conventional leveling agent or without a leveling agent, and that, in the case of use of the copolymers from examples 1 and 2 as leveling agents, the results achieved with regard to profile, gloss and haze are comparable or better than those in the case of use of a polymer from example 3 synthesized with a commercially available methacryloyl-functional polydimethylsiloxane, Silaplane FM-0721 (α-butyldimethylsiloxy-ω-(3-methacryloyloxypropyl)polydimethylsiloxane).

b) Testing on Soil-Repellent Surfaces

The substances from examples 1, 2, 3, 4 are incorporated into the acrylate-melamine baking resin as described above. One day after shaking, the additized varnishes are drawn down onto a glass pane with a 150 µm box-type coating bar. After a ventilation time of 10 minutes, the glass panes are baked at 140° C. for 25 minutes. Two glass panes were produced for each additized varnish.

The varnish films obtained are assessed with regard to their soil- and oil-repellent action by the following criteria:

Visual Assessment of the Varnish Surface:

The varnish surface is examined for cloudiness in the film and surface defects, such as craters, spots and incompatibilities.

Rating: 1-5
1=Varnish surface without surface defects
5=Varnish surface with many surface defects Edding Test:

A permanent marker of the "Edding 400" type is used to write on the varnish surface, and a visual assessment is made as to whether the surface is writable. An assessment is made as to whether the ink on the surface spreads or draws together. After the ink has dried, an attempt is made to wipe it off with a dry cloth.

Rating: 1-5:
1=Ink draws together, can be removed with a paper towel without residue
5=Ink spreads very well on substrate, is virtually impossible to remove Soiling with Bayferrox Powder:

3 teaspoons (~15 g) of Bayferrox 130M, iron oxide pigment, Bayer AG, are scattered onto the varnish surface and rinsed off again with distilled water in 5 squirting operations with the aid of a wash bottle. The very substantially residue-free surface is visually assessed.

Rating: 1-5:
1=Bayferrox powder can be washed off with water without residue
5=No cleaning effect on rinsing with water, a large red spot remains Mineral Oil Runoff Test:

One drop of commercial mineral oil is placed onto the varnish surface. Subsequently, the coated varnish surface is tilted until the drop has run about 10 cm. After 5 minutes have elapsed, the oil trace or renewed drop formation is visually assessed.

Rating: 1-5:
1=The oil trace immediately reforms individual droplets
5=The oil trace does not reform, and possibly spreads further The results obtained are shown in the following table:

|  | Surface | Edding | Edding wiped off | Bayferrox | Mineral oil |
|---|---|---|---|---|---|
| No additive | 5 | 5 | 5 | 1 | 5 |
| Comparative example 4 | 4 | 5 | 5 | 3 | 4 |
| Comparative example 3 | 1 | 1 | 1 | 1 | 1 |
| Inventive example 1 | 1 | 1 | 1 | 1 | 1 |
| Inventive example 2 | 1 | 1 | 1 | 1 | 1 |

The results show that the use of the copolymers from examples 1 and 2 as additives achieves a very good soil- and oil-repellent surface, and also for the additive which has been synthesized with a commercially available methacryloyl-functional polydimethylsiloxane, Silaplane FM-0721 (α-butyldimethylsiloxy-ω-(3-methacryloyloxypropyl)polydimethylsiloxane) (comparative example 3).

Use Examples with Polydimethylsiloxane-Containing Copolymers as Wetting Agents and Dispersants c) Dispersion of Pigments Examples for Production of Pigment Preparations According to table 1, for a batch size of 100 g in each case, after initially charging the first position, the further positions are weighed individually into a 250 ml screwtop bottle while stirring. After adding the same amount of glass beads of size 1 mm, dispersion was effected by means of a shaker (LAU disperser) at cooling level 2 for 2 hours. The dispersion operation was followed by the removal of the glass beads using a 240 µm sieve (F4000 folded sieve). As comparative examples relating to the prior art, pigment preparations were produced without and with a commercial product based on a polyether-modified polysiloxane (DC 5562) and with a dispersing additive based on a silicone acrylate without urethane bonds (example 8).

TABLE 1

| | Example | | | | | |
|---|---|---|---|---|---|---|
| | A [% by wt.] | B [% by wt.] | C [% by wt.] | D [% by wt.] | E [% by wt.] | F [% by wt.] |
| D5 silicone oil | 50.00 | 45.50 | 45.50 | 45.50 | 45.50 | 45.50 |
| DC 5562 | | 4.50 | | | | |
| Copolymer according to example 8 | | | 4.50 | | | |
| Copolymer according to example 6 | | | | 4.50 | | |
| Copolymer according to example 5 | | | | | 4.50 | |
| Copolymer according to example 7 | | | | | | 4.50 |
| Bayferrox red 130M | 50.00 | 50.00 | 50.00 | 50.00 | 50.00 | 50.00 |
| | 100.00 | 100.00 | 100.00 | 100.00 | 100.00 | 100.00 |

The solids content of the inventive copolymer or of the comparative compounds is 9% by weight based on the pigment.

Table 2 lists the viscosities of the pigment preparations.

TABLE 2

Viscosities (EN ISO 2884-1:2006) of the pigment preparations and of the comparative examples [in Pas] as a function of shear rate [in 1/s] after production and storage.

| | Shear rate [1/s] | Pigment preparations according to example | | | | | |
|---|---|---|---|---|---|---|---|
| | | A | B | C | D | E | F |
| Viscosity after production | 0.1 | 187 | 30.5 | 0.78 | 0.13 | 0.16 | 0.11 |
| Viscosity after storage at 50° C. for 1 week | 0.1 | 101 | 29.1 | 3 | 0.22 | 0.26 | 0.59 |

The viscosities of the pigment preparations were measured at 23° C. with the Stresstech rheometer from Rheologica, with the C 40-1° cone measurement system (measurement gap 0.032 mm), at given shear rates. Before applying the sample, the pigment preparations were stirred with a spatula for homogenization. The assembly of the test system was immediately followed by the measurement.

The pigment preparations produced with an inventive copolymer (examples 5, 6 and 7) show the lowest viscosities in the test both after production and after storage at 50° C. for one week. Compared to the examples with a copolymer based on a silicone acrylate without urethane bonds (example 8) or a commercial product based on a polyether-modified polysiloxane (DC5562), the viscosities of the inventive examples are much lower.

The invention claimed is:

1. A copolymer obtained by free-radical copolymerization of one or more urethane-based, polysiloxane-containing macromonomers having only one free-radically polymerizable double bond and at least one or more further free-radically polymerizable monomers, wherein:
   the copolymer is a (meth)acrylate copolymer and the macromonomer(s) is/are obtainable by reaction of at least one hydroxy-functional (meth)acrylate and at least one polysiloxane-, polyether-polysiloxane-, polyester-polysiloxane- or polyether/polyester-polysiloxane-modified isocyanate,
   optionally in the presence of a catalyst for formation of the urethane bond and of at least one inhibitor of free-radical polymerization, and in that at least 85% of the monomers used for preparation of the copolymer have only one free-radically polymerizable double bond;
   wherein the copolymer has a weight-average molecular weight of 2000 to 100 000 g/mol; and
   wherein the at least one polysiloxane-, polyether-polysiloxane-, polyester-polysiloxane- or polyether/polyester-polysiloxane-modified isocyanate is purified prior to the reaction and has the general formula (II)

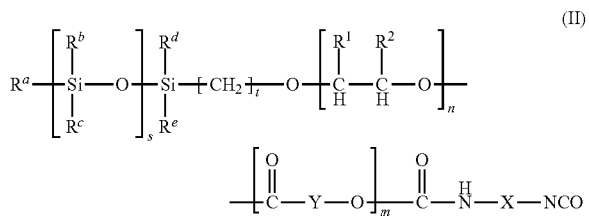

in which all R' and $R^2$ are independently of one another H, alkyl or aryl,

X is alkylene, cycloalkylene or aralkylene, all Y are alkylene or cycloalkylene, n and m are independent of one another, where the sum of n+m =0 to 100, $R^a$ is a saturated linear alkyl radical having 1 to 30 carbon atoms, a saturated branched or cyclic alkyl radical having 3 to 30 carbon atoms, or an aryl radical, an alkylaryl radical or an arylalkyl radical having 6 to 30 carbon atoms, all $R^b$ and $R^c$ are independently of one another saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals or arylalkyl radicals having 6 to 12 carbon atoms, all $R^d$ and $R^e$ are independently of one another $R^a[SiR^b R^c O]_s$, where $R^a$, $R^b$ and $R^c$ are each as defined above and are selected independently of one another, saturated linear alkyl radicals having 1 to 6 carbon atoms, saturated branched or cyclic alkyl radicals having 3 to 6 carbon atoms, alkene radicals having 2 to 6 carbon atoms, or aryl radicals, alkylaryl radicals or arylalkyl radicals having 6 to 12 carbon atoms, and s=1 to 400 and t=2 to 30.

2. The copolymer as claimed in claim 1, wherein the molar ratio of the at least one hydroxy-functional (meth)acrylate to the at least one polysiloxane-, polyether-polysiloxane-, polyester-polysiloxane- or polyether/polyester-polysiloxane-modified isocyanate is 4:1 to 1:1.

3. The copolymer as claimed in claim 1, wherein the at least one hydroxy-functional (meth)acrylate has the general formula (I):

$$U\text{-}L\text{-}O\text{-}H \tag{I}$$

where U is an ethylenically unsaturated, free-radically polymerizable head group having acryloyl [$H_2C=CH-C(=O)-O-$] or methacryloyl [$H_2C=C(CH_3)-C(=O)-O-$] structure and L is a divalent organic radical which does not contain any free-radically polymerizable groups, preferably selected from the group consisting of alkylene radicals, polyester radicals and polyalkylene oxide radicals.

4. The copolymer as claimed in claim 1, wherein at least 90% of the monomers used have only one free-radically polymerizable double bond.

5. The copolymer as claimed in claim 1, wherein not more than 5% of the polymerized monomers contain fluorine.

6. The copolymer as claimed in claim 1, wherein the copolymer is formed to an extent of 0.2 to 95% by weight, based on the total weight of all macromonomers and comonomers used, of polymerized macromonomers.

7. A process for preparing a copolymer as claimed in claim 1, wherein one or more macromonomers obtained by reaction of at least one hydroxy-functional (meth)acrylate and at least one polysiloxane-, polyether-polysiloxane-, polyester-polysiloxane- or polyether/polyester-polysiloxane-modified isocyanate, optionally in the presence of a catalyst for formation of the urethane bond and of at least one inhibitor of free-radical polymerization, and one or more further free-radically polymerizable comonomers are free-radically copolymerized, at least 85% of the monomers used to prepare the copolymer having only one free-radically polymerizable double bond, and the polysiloxane-, polyether-polysiloxane-, polyester-polysiloxane- or polyether/polyester-polysiloxane-modified isocyanate used having been purified.

8. A process for preparing a copolymer as claimed in claim 1, wherein the (meth)acrylate copolymer is obtained by reacting one or more urethane-based components of a polysiloxane-, polyether-polysiloxane-, polyester-polysiloxane- or polyether/polyester-polysiloxane-modified isocyanate with a hydroxy-functional (meth)acrylate copolymer formed from at least one hydroxy-functional (meth)acrylate monomer and one or more further free-radically polymerizable comonomers, optionally in the presence of a catalyst for formation of the urethane bond, at least 85% of the monomers used for preparation of the hydroxy-functional (meth)acrylate copolymer having only one free-radically polymerizable double bond.

9. A coating material, plastic, cosmetic or homogenous dispersion comprising one or more of the copolymers prepared according to claim 7.

10. The coating material, plastic, cosmetic or homogenous dispersion as claimed in claim 9, wherein the copolymer content is 0.01 to 5% by weight, based on the overall composition of the coating material or of the plastic, in coating materials or plastics; or 0.01 to 90% by weight in homogeneous dispersions, based on the overall composition of the homogeneous dispersion.

11. A process for producing a homogeneous dispersion comprising at least one copolymer as claimed in claim 1 wherein the process comprises the mixing of at least one pigment and/or filler in a carrier selected from the group consisting of at least one silicone oil, with the aid of at least one copolymer as claimed in claim 1.

12. A coating material, plastic or homogeneous dispersion comprising at least one copolymer as claimed in claim 1.

13. The coating material, plastic or homogenous dispersion as claimed in claim 12, wherein the copolymer content is 0.01 to 5% by weight based on the overall composition of the coating material or of the plastic, in coating materials or plastics; or 0.01 to 90% by weight in homogeneous dispersions based on the overall composition of the homogeneous dispersion.

14. A coating material, plastic, cosmetic or homogenous dispersion comprising one or more of the copolymers prepared according to claim 8.

15. The coating material, plastic, cosmetic or homogenous dispersion as claimed in claim 14, wherein the copolymer content is 0.01 to 5% by weight based on the overall composition of the coating material or of the plastic, in coating materials or plastics; or 0.01 to 90% by weight in homogeneous dispersions based on the overall composition of the homogeneous dispersion.

16. The copolymer as claimed in claim 4, wherein at least 98% of the monomers used have only one free-radically polymerizable double bond.

17. The copolymer as claimed in claim 1, wherein the copolymer has a weight-average molecular weight of 5000 to 75000 g/mol.

18. The copolymer as claimed in claim 5, wherein not more than 2% of the polymerized monomers contain fluorine.

* * * * *